(12) United States Patent
Pahud et al.

(10) Patent No.: US 7,512,537 B2
(45) Date of Patent: Mar. 31, 2009

(54) NLP TOOL TO DYNAMICALLY CREATE MOVIES/ANIMATED SCENES

(75) Inventors: Michel Pahud, Redmond, WA (US); Takako Aikawa, Bellevue, WA (US); Lee A. Schwartz, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 584 days.

(21) Appl. No.: 11/086,880

(22) Filed: Mar. 22, 2005

(65) Prior Publication Data
US 2006/0217979 A1  Sep. 28, 2006

(51) Int. Cl.
*G10L 21/00* (2006.01)
*G10L 15/00* (2006.01)
*G06F 17/27* (2006.01)
*G06T 13/00* (2006.01)

(52) U.S. Cl. ................ 704/272; 704/9; 704/235; 345/473

(58) Field of Classification Search ............ 704/9, 704/235, 272; 345/476
See application file for complete search history.

(56) References Cited

U.S. PATENT DOCUMENTS

| | | | |
|---|---|---|---|
| 5,983,190 A * | 11/1999 | Trower et al. | 704/276 |
| 6,148,173 A * | 11/2000 | Bell | 434/309 |
| 6,661,418 B1 * | 12/2003 | McMillan et al. | 345/473 |
| 7,016,828 B1 * | 3/2006 | Coyne et al. | 704/9 |
| 7,039,589 B2 * | 5/2006 | Whitham | 704/270 |
| 7,076,430 B1 * | 7/2006 | Cosatto et al. | 704/275 |
| 2001/0049596 A1 * | 12/2001 | Lavine et al. | 704/9 |
| 2002/0035467 A1 * | 3/2002 | Morimoto et al. | 704/9 |
| 2002/0133350 A1 * | 9/2002 | Cogliano | 704/270 |
| 2003/0093275 A1 * | 5/2003 | Polanyi et al. | 704/251 |
| 2003/0149569 A1 * | 8/2003 | Jowitt et al. | 704/275 |
| 2005/0043955 A1 * | 2/2005 | Gong et al. | 704/276 |

(Continued)

OTHER PUBLICATIONS

Karlin, R. F. 1988. Defining the semantics of verbal modifiers in the domain of cooking tasks. In Proceedings of the 26th Annual Meeting on Association For Computational Linguistics (Buffalo, New York, Jun. 7-10, 1988). Annual Meeting of the ACL. Association for Computational Linguistics, Morristown, NJ, 61-67. DOI= http://dx.doi.org/10.3115/982.*

(Continued)

*Primary Examiner*—Talivaldis Ivars Smits
*Assistant Examiner*—Douglas C Godbold
(74) *Attorney, Agent, or Firm*—Amin, Turocy & Calvin, LLP

(57) ABSTRACT

The subject invention provides a unique system and method that facilitates integrating natural language input and graphics in a cooperative manner. In particular, as natural language input is entered by a user, an illustrated or animated scene can be generated to correspond to such input. The natural language input can be in sentence form. Upon detection of an end-of-sentence indicator, the input can be processed using NLP techniques and the images or templates representing at least one of the actor, action, background and/or object specified in the input can be selected and rendered. Thus, the user can nearly immediately visualize an illustration of his/her input. The input can be typed, written, or spoken—whereby speech recognition can be employed to convert the speech to text. New graphics can be created as well to allow the customization and expansion of the invention according to the user's preferences.

18 Claims, 25 Drawing Sheets

U.S. PATENT DOCUMENTS

2006/0184355 A1* 8/2006 Ballin et al. .................. 704/8

OTHER PUBLICATIONS

Lieberman, et al. "An a Agent for Annotating and Retrieving Images" IEEE Computer(Jul. 2001) pp. 57-61.

Lieberman, et al. "Adaptive Linking between Text,and Photo Using Common Sense Reasoning" MIT MediaLab (2002) 10 pages.

Druin, et al. "Interaction Design and Children" Communications of the ACM (Jan. 2005), vol. 28 No. 1, 3 pages.

Fellbaum. "WorldNet: An Electronic Lexical Databse" (1998) Cambridge, MA, MIT Press.

Winograd. "A Procedural Model of Language Understanding" In Cummins(ed.) Minds, Brains, Computers: The Foundations of Cognitive Science (2000) Blackwell Publishers, pp. 95-113.

Heidorn. "Intelligence Writing Assistance." In Dale R., Moisl H., and Somers H. (eds.), A Handbook of Natural Language Processing: Techniques and Applications for the Processing of Language as Text. Marcel Dekker, New York (1988), 181-207.

* cited by examiner

SENTENCE 1: ONCE UPON A TIME A DRAGON FLEW OVER A BEACH

AFTER ENTERING THE PERIOD:

SENTENCE 2: SUDDENLY, IT FELL DOWN

AFTER ENTERING THE PERIOD:

SENTENCE 3: LITTLEGUY KICKED THE DRAGON

AFTER ENTERING THE PERIOD:

SENTENCE 4: THE STUNNED DRAGON ROSE AND RAN AWAY.

AFTER ENTERING THE PERIOD:

SENTENCE 5: LITTLEGUY WAS THIRSTY AND DRANK HIS WATER IN THE FOREST.

AFTER ENTERING THE PERIOD:

RESULTING SCENE WITH THE SKETCHED ROCK:

NLP TOOL TO DYNAMICALLY CREATE MOVIES/ANIMATED SCENES

TECHNICAL FIELD

The subject invention relates generally to animation and in particular, to generating an illustrated or animated scene that corresponds to natural language input in real time.

BACKGROUND OF THE INVENTION

Throughout the last several years, computer users have incorporated both desktop and mobile computers in their lives due in large part to the efficiency and convenience that these types of devices often provide. Despite the many advances of computer technology and its presence in so many different aspects of people's daily routines, some computer-related tasks continue to lack full performance optimization due to assumed obstacles and barriers; and thus remain inefficient and cumbersome to perform. The integration of natural language processing and graphics generation is one such example. In practical terms, imagine a user has a movie idea with a very weak or vague story line that he would like to propose to his supervisor. To support his relatively shallow text, he would like to add illustrations to help his supervisor visualize the idea. Using conventional systems and techniques, the user must scavenge through a multitude of image sources to find any images that, at best, remotely convey his text and/or the meaning of the text. Unfortunately, this task can be painstakingly slow, impracticable, and even hinder user productivity and performance.

In educational scenarios, students are often tasked with creative writing assignments as a means to learn vocabulary and proper word usage and grammar, to improve writing skills and to foster creativity. However, many learning tools currently available to students inadequately satisfy these needs. In many cases, for instance, the student is limited to words or text only—no pictures can be incorporated. When including pictures is an option, too much time is often required to find the appropriate one or else only a limited variety of pictures is provided to the student. Thus, there remains a need for a more flexible system or tool that facilitates user efficiency and performance.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention relates to a system and/or methodology that provide a novel approach to associating animations with natural language processing. In particular, the system and method provide for generating a scene or animation based at least in part upon text entered in a natural language form. This can be accomplished in part by selecting one or more images and templates according to the user's input and then applying the appropriate images to the appropriate templates to generate the animation. As a result, a user can readily view an illustration of their text as it is provided or entered (in natural language). Thus, graphics and/or animation can be rendered dynamically, thereby relieving the user of the task of searching through any number of databases for the relevant image(s) to correspond to his/her text.

The subject invention can be accomplished in part by analyzing the user's natural language input and then rendering the most appropriate graphical illustration corresponding to the user's input. According to one aspect of the invention, natural language input can be analyzed one sentence at a time, for example, in order to generate a potentially different illustration for each sentence. The generation of each illustration can depend on the input. Through the use of natural language processing, various types of information can be extracted and identified from the input such as the "actor", "action", "location" or background, object, as well as other functional roles pertaining to the input including, but not limited to mood, color, dimension, or size. This information can be characterized in XML format, for example, which facilitates identifying and selecting the most suitable graphical image for each respective piece of information. Using the XML-based information, the appropriate image(s) can be accessed from a graphics library and assembled to create a scene that is representative of the input. It should be appreciated that other languages or formats in addition to XML can be utilized as well to carry out the subject invention and such are contemplated to fall within the scope of the invention.

The graphics library can include a plurality of default actors, actions, objects, and backgrounds. For example, the default actors can include a man, a woman, a dog, a cat, etc. . . . Thus, when the user inputs "the woman jumped", a generic image of a woman (female actor) jumping can be generated and visualized almost immediately after it is entered by the user. The number of times an action is performed can be determined by the form of the input. For instance, "the woman jumped" can indicate a rendering of the woman performing a single jump, whereas "the woman was jumping" can indicate a rendering of the woman jumping more than once or continuously until the next input is received and processed.

In addition to the default set of graphics initially provided to the user, the graphics library can also be customized by each user. That is, the user can readily create his or her particular actors, actions, backgrounds, and objects as well as replace any existing ones. Consequently, the user can personalize the graphic environment and use the desired vocabulary such as slang terms, made-up terms, technical terms, and/or uncommon dictionary terms.

Moreover, an environment is created that can provide an immediate visualization of a scene to the user based on any text entered by the user. Furthermore, as a plurality of text is entered, the scenes can accumulate and be stored in the order in which they were generated to yield a series of scenes. The scenes can be assembled and replayed such as in a movie format. Sound or speech can be added to individual scenes, actors, actions, objects, and/or backgrounds or to the overall series as well.

The natural language input can be entered in the form of speech whereby various speech-to-text recognition techniques can be employed to translate the speech into a form suitable for natural language processing. Due to the extensibility of the invention, it can be utilized in a variety of personal, educational, and commercial applications across different age groups and languages.

To the accomplishment of the foregoing and related ends, certain illustrative aspects of the invention are described herein in connection with the following description and the annexed drawings. These aspects are indicative, however, of but a few of the various ways in which the principles of the invention may be employed and the subject invention is intended to include all such aspects and their equivalents.

Other advantages and novel features of the invention may become apparent from the following detailed description of the invention when considered in conjunction with the drawings.

DETAILED DESCRIPTION OF THE INVENTION

Figure 1:
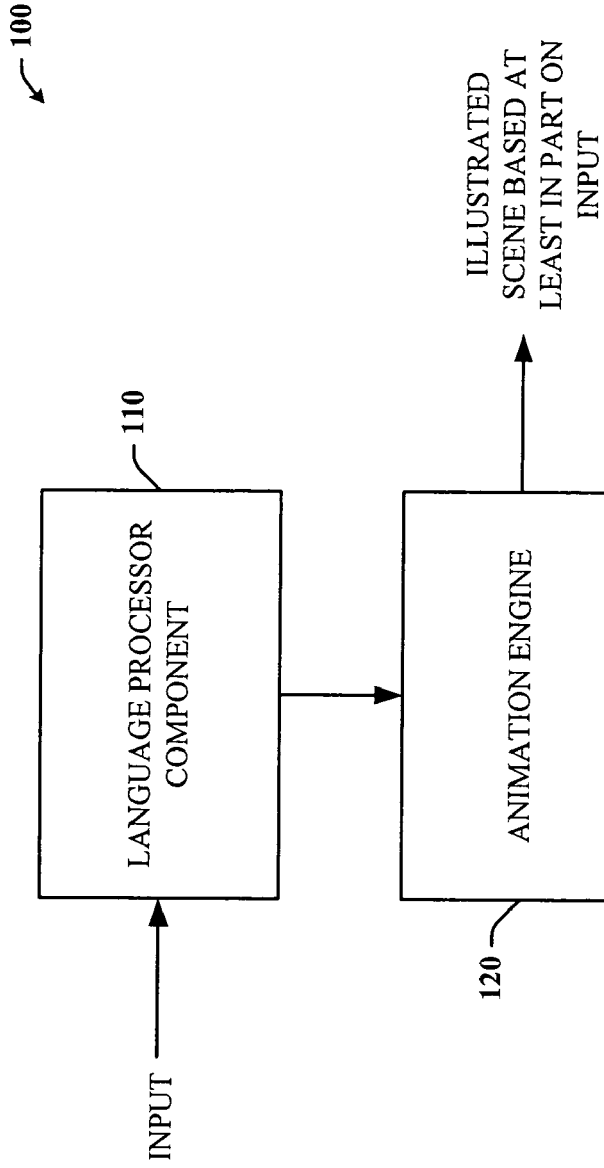
FIG. 1 is a high-level block diagram of a natural language illustration system in accordance with an aspect of the subject invention.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

The subject invention can incorporate various inference schemes and/or techniques in connection with generating new graphics to correspond to actors, actions, objects, and backgrounds. For example, dimensions, position, and the like can be automatically optimized and accommodated for depending on the content of the input.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The terms "template" and "skeleton" are also used throughout the description of the subject invention. "Template" generally refers to a placeholder for an image. This placeholder can (eventually) move, turn, change size, etc. Templates can be used in different ways. For example, a template can be used as a placeholder of an object (e.g., a ball) that follows a parabolic trajectory when kicked (or otherwise acted upon) by an actor. In addition, a template can be used for an actor's head placeholder. Similarly, one can imagine a 2-D actor's body created with templates where each template contains a part of the body (right forearm, right shoulder, left forearm, etc.). Inside a template, one could also imagine having an animation (series of images) instead of a static image. For instance, a user may want to use an actor's head based on a series of images of a head that blink the eyes and move the mouth instead of a static head.

Skeletons are generally more related to 3-D motion files (but the same could also be applied to 2-D). For instance, in the exemplary screen captures which follow (e.g., FIGS. 8-10 and 13-17, infra), a series of images for any action can be pre-rendered (i.e., the woman kick, the man kick, the dragon kick, the man drink, etc). For example, one motion file for "kick" can be applied to all or almost all the actor meshes. The motion file makes a skeleton do the action (e.g., kick) and then this same motion file can be applied to the different actors' meshes. This works because all of the bones of the actors' skeletons are named the same. For instance, the same motion file for the "kick" action can be applied to the mesh of a woman and the mesh of a man.

The subject invention links the arrangement of graphical images with natural language processing. Thus, as natural language input is processed, appropriate images can be instantly rendered according to the natural language input. In practice, essentially any kind of natural language input can be illustrated. For example, as a user types in a story, a series of illustrated or animated scenes can be generated to go along with the story. Both children and adults can utilize this kind of tool to facilitate learning, story telling, communication, comprehension, and writing skills. For purposes of discussion, the subject invention will now be described from the perspective of a user writing a story; though it should be appreciated that many other applications are possible and within the scope of the invention. From at least the perspective of story writing, the invention mitigates the drudgery and the distraction of (manually) searching through art or other image stores for just the right picture by automatically selecting the most appropriate pictures and rendering them on the fly as the story is created and continues to unfold.

Referring now to FIG. 1, there is shown a high-level block diagram of a natural language illustration system 100 in accordance with an aspect of the subject invention. The system includes a language processor component 110 that can receive input such as text or audio input from a user. The input can be provided by the user in natural language form such as "the dog jumped over the fence" rather than in a computer coded form. Furthermore, the language processor component 110 can support and analyze a language in natural language format. For example, aside from English, other languages can be processed as well.

Once received, the language processor component 110 can analyze the input and extract any pertinent information that identifies the types or names of images to render and the manner in which to render them. This information can be communicated to an animation engine 120 which selects and renders the appropriate images to match to the user's input. The animation engine 120 can pull at least one image and/or at least one template from one or more databases to provide an adequate visual depiction of the user's input. The images can include color or animation and can be scaled to an appropriate dimension with respect to the other images included in the overall scene. Thus, by simply entering natural language input into the system 100, an animation or illustrated scene based at least in part upon that input can be created and readily viewed by the user.

Figure 2:
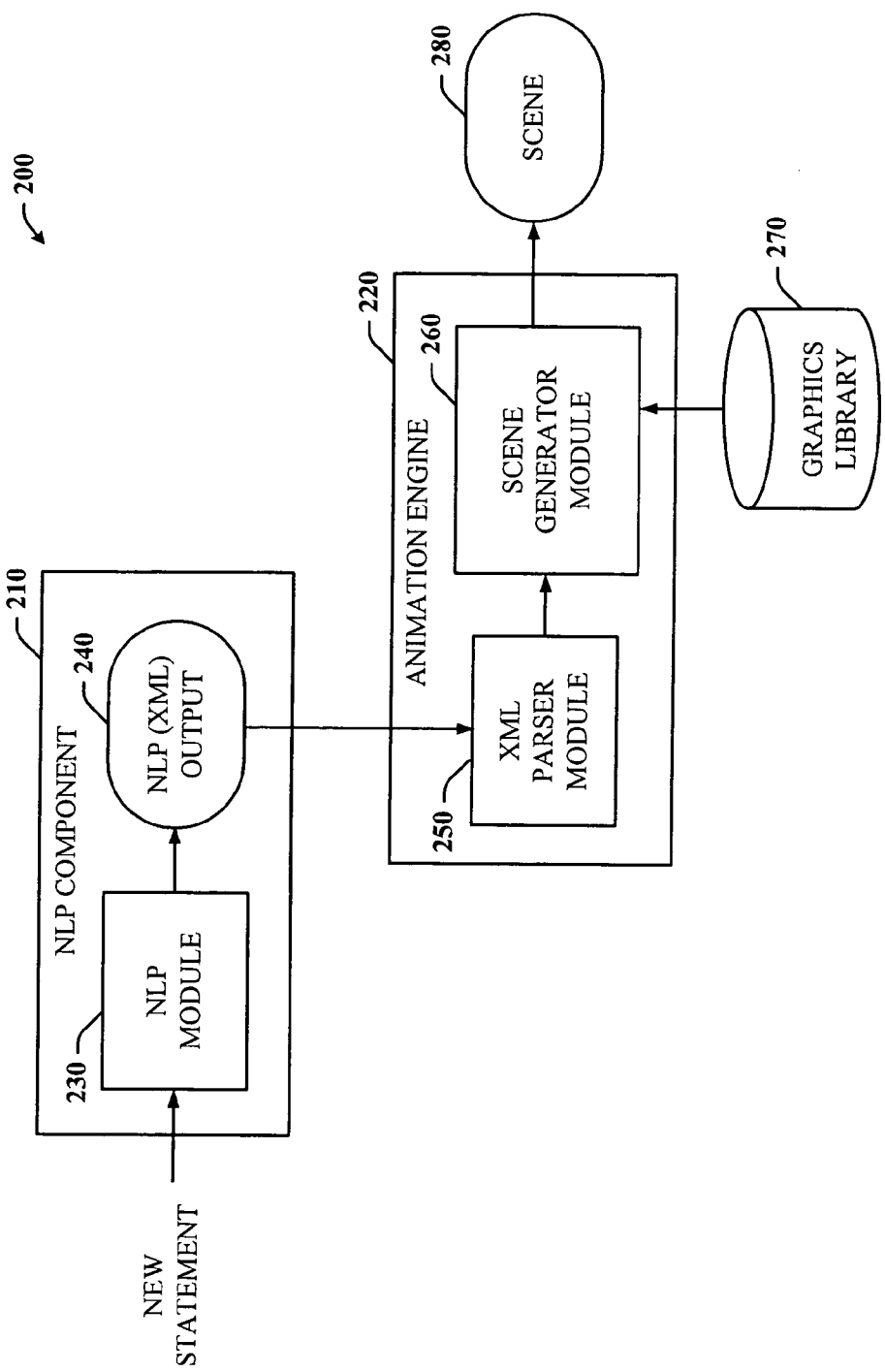
FIG. 2 is a block diagram of a natural language-to-illustration conversion system in accordance with an aspect of the subject invention.

Referring now to FIG. 2, a natural language-to-illustration conversion system 200 is depicted in accordance with an aspect of the invention. In general, the system 200 can create a new scene that the user can replay for each statement entered into the system 200. The system 200 includes a natural language processing (NLP) component 210 that processes the statement into a form usable by an animation engine 220—which then dynamically illustrates and/or animates the statement for the user's view.

In particular, an NLP module 230 can be called upon receipt of the new statement (input) when an indication of the end of a sentence or end-of-sentence indicator (e.g., hitting "Enter", a hard return", a period) is detected. The NLP component 210 can understand the basic semantic structure, or logical form, of a given sentence—that is, WHO (subject-actor) did WHAT ACTION (verb-action) to WHAT (object) WHERE (location or background)—based on conventional NLP guidelines.

For example, the logical form of the sentence "On the beach the man kicked a ball." is:

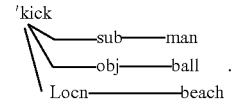

The logical form information can also include different types of attributes for each actor, action, location, or object. Such attributes include but are not limited to dimension, size, color, and mood or expression. Once the sentence is converted to its logical form, the NLP module 230 can read the logical form information and eventually translate the logical form information into core terms.

A core term is essentially a word that is associated with a graphic and that may have a plurality of synonyms that could be used in its place. Because natural language is infinite, it is practically impossible to manually associate every word with a graphic. Thus, to reduce the burden of rendering a graphic for every word, some words can be considered synonyms of other words already associated with graphics. For instance, consider the words dwelling, home, house, cabin, and cottage. Each of these words stands for related objects and hence could be illustrated in the same way. Therefore, it may be unnecessary to generate different graphics for each word. Instead, they can all be assigned the core term HOUSE and associated with the same corresponding graphic. So in the sentence—"My cat ran through the cottage."—the NLP module 230 can identify that the core term for "cottage" is HOUSE and then use the core term HOUSE in the logical form rather than the input word (cottage).

In addition to resolving synonym usage, there are many linguistic issues that must be resolved before information that is necessary and sufficient to represent the meaning of a sentence can be extracted for use by the graphics component. Anaphora resolution, negation, ellipsis, and syntactic variation are a few representative examples.

When writing a story or any type of prose, it is inevitable that the user will employ pronouns to mitigate unnecessary repetition and to create a natural, coherent, and cohesive piece of text. For example, in the two samples (A and B) of text below, "man" is repeated in each sentence in sample A, whereas pronouns are used appropriately in sample B:

| Sample A: | Sample B: |
|---|---|
| One day there was a man jogging on the beach. The man found a ball and kicked it to distract the dragon. The dragon ignored the ball and ran toward the man instead. | One day there was a man jogging on the beach. He found a ball and kicked it to distract the dragon. The dragon ignored the ball and ran toward him instead. |

The pronoun "He" in the second sentence and "him" in the third sentence refer to a man in the first sentence. Pronouns cannot be passed to the graphic component 220 without first associating them with the appropriate graphics. The problem of resolving the referent of a given pronoun ("anaphora resolution") can be dealt with by the NLP component 210. The NLP component 210 can understand who "he" and "him" are and communicate this information to the graphics component 220, which otherwise would be at a loss to associate a graphic with the pronoun. The NLP component 210 includes the referents of pronouns (and core terms thereof), rather than the pronouns themselves, in the logical form. Hence, in the subject system 200, users can employ pronouns at their leisure to mitigate the redundancy of particular nouns as their stories develop.

Other linguistic issues such as negation and ellipsis can also arise in the process of understanding text which can make it more challenging to communicate only interesting and relevant information to the graphics component 220. Take, for example, the following sentence which exemplifies both issues:

The man was not jumping on the beach, but the woman was.

Notice that only man is explicitly associated with jumping in this sentence. However, because the verb is negated, the NLP component 210 must be careful not to pass the information that man is the actor and jump is the action in this sentence on to the graphics component 220. Moreover, even though there is no explicit verb jump following woman, the NLP component 210 must extract the information that woman is the actor of interest and jump is the action of interest. In the end, the graphics of a woman, not a man, jumping on the beach should be generated to coincide with the author's (user's) intentions.

Finally, syntactic variation can be resolved by the NLP component 210 as well. Sentences like C and D below are different syntactically, but the difference is normalized by the NLP component 210 so the system 200, in general, needs to do no extra work to generate the same graphics for either sentence (C and D):

| Sentence C: | Sentence D: |
| --- | --- |
| The man kicked the ball. | The ball was kicked by the man. |

Thus, the NLP component 210 addresses and resolves synonym usage and a variety of linguistic issues before composing the logical form of a sentence. Overall, the fine-grained analysis of the NLP component 210 minimizes the work needed to be done by the graphics component 220 while providing the user with flexibility of expression.

Once the logical form information is determined, it can be translated into output 240 in an XML format. It should be appreciated that in one approach, the XML formatted output includes only core terms rather than any input words; however other approaches can include any relevant input words in the output 240. The NLP component 210 communicates the output 240 to the animation engine 220 which includes an XML parser module 250 and a scene generator module 260. The output 240 from the NLP component 210 becomes the input for the XML parser module 250 that can read the actor, action, object, and/or location information. The XML parser module 250 calls the scene generator module 260 to access the relevant actor, action, object, and/or location from a graphics library 270. The scene generator module 260 arranges the respective images from the graphics library 270 to generate a scene 280 which may be in 2-D or 3-D space and either static or animated.

The graphics library 270 can include a plurality of images for a variety of actors, actions, objects, and locations. Alternatively or in addition, the graphics library 270 can also include a plurality of templates/skeletons for actors, actions, locations, and/or objects to which one or more images can be applied to result in a dynamic graphical rendering of the user's sentence. In addition to using existing graphics or images in the graphics library 270, graphics or images can be rendered dynamically (on-the-fly) using 3-D meshes, motion files and/or texture files.

The user can also customize the graphics library 270 by creating new images or modify existing ones. This can be accomplished in part by employing pen and ink technology such as on a tablet PC, importing (e.g., copy-paste; drag-drop) 2-D images such as photos or video stills, and/or adding sound. When a new image is made, the user assigns it a name which gets added to the NLP component's term dictionary or database as a core item or term. Thus, imagine a new actor is created and named "Gus". Whenever the user enters a sentence and includes "Gus" therein, the image of Gus as created by the user is accessed from the graphics library 270 and is rendered in the scene 280.

Figure 3:
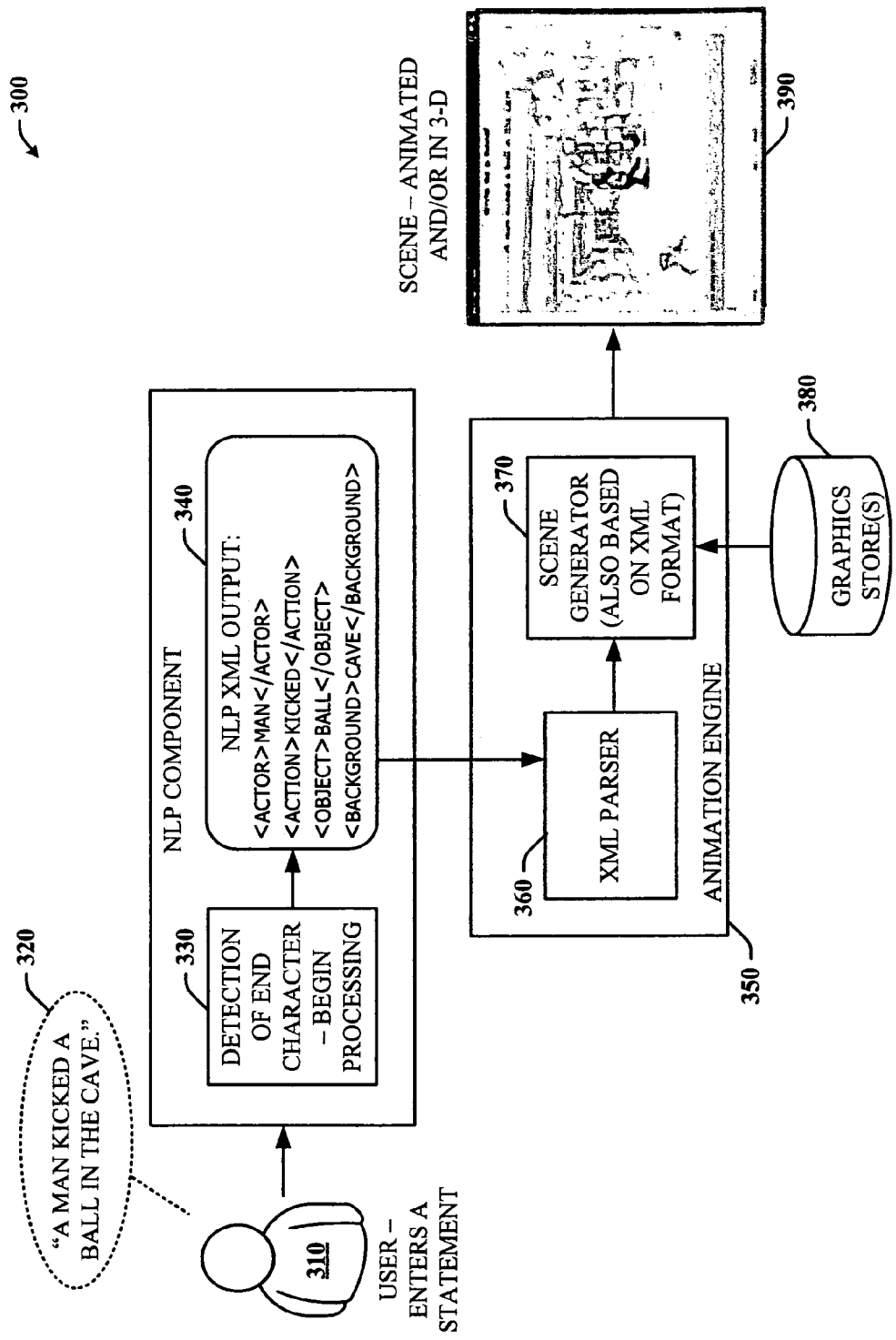
FIG. 3 is a block diagram of a natural language-to-illustration conversion system in accordance with an aspect of the subject invention.

As demonstrated in the diagram 300 of FIG. 3, suppose that a user 310 has entered the following statement 320:

A man kicked a ball in the cave.

The marker of the end of an input (e.g., period, hard "return", etc.) can be detected which signals the natural language processing of the text input to begin (330). The resulting output 340 in XML format can identify MAN as the actor, KICK as the action, BALL as the object, and CAVE as the background (location). This output 340 can then be passed to an animation engine 350 and in particular to an XML parser 360 that construes the output 340 and communicates it to a scene generator 370. The scene generator 370 retrieves a MAN graphic, a KICK graphic, a BALL graphic, and a CAVE graphic from one or more graphics stores 380 and renders the graphics as indicated by the XML format into a scene 390. The scene 390 can be animated depending on whether any of the graphics are animated and/or appear in 3-D.

When the user is finished entering statements, the generated scenes can be combined for replay like a movie or slide show presentation. Each set of scenes (each movie) can be saved and replayed again at a later time. Audio can also be added to each scene or to the overall presentation. Furthermore, the graphics and "words" of each sentence can maintain a cooperative relationship; thus, each scene can maintain a link to its respective sentence. For instance, if the user wants to reorder at least one of the sentences, doing so also reorders the corresponding scene to ultimately produce a new movie. The new movie can be saved as well.

Figure 4:
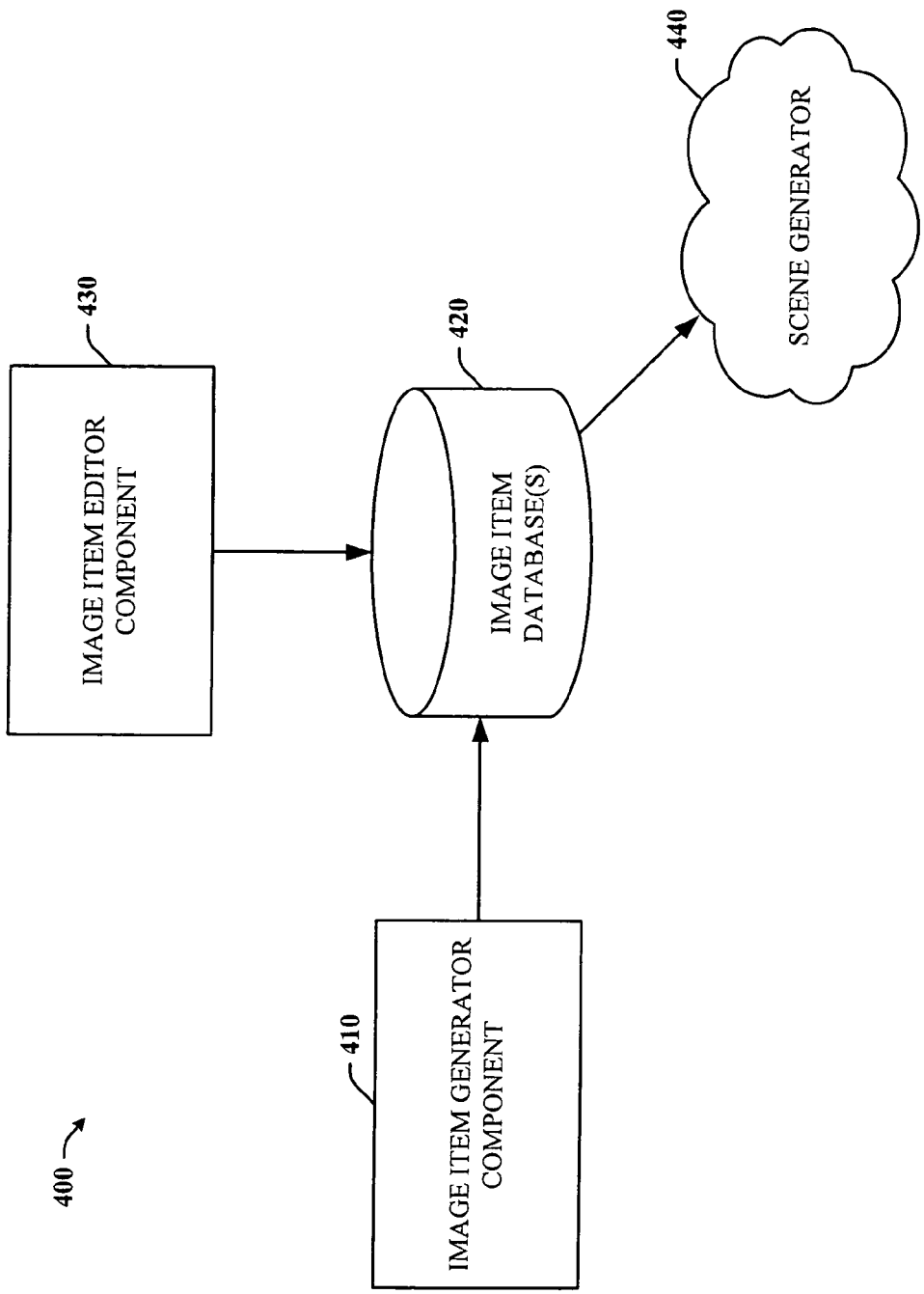
FIG. 4 is a block diagram of an item generation system that facilitates the replacement of existing or the creation of new items for use in the natural language illustration system of FIG. 1 in accordance with an aspect of the subject invention.

As previously mentioned, the graphics library or database can be customized by the user, thereby allowing the user to alter or add new image items thereto. A block diagram of an exemplary image generation system 400 is depicted in FIG. 4 in accordance with an aspect of the subject invention. The system 400 includes an image generation component 410 that creates new image items such as actors, actions, locations and/or objects based on input from the user. The user can sketch or draw the new item or make use of one or more templates to facilitate the creation process. For example, to create a new male actor that resembles the user's friend TOM, the user can retrieve a male actor template (skeleton). The template can be of a "man" graphic capable of performing animation with the face portion left blank for the user to complete—either with a drawing or with a digital image of TOM's face. Once completed to the user's satisfaction, this particular graphic can be named TOM and stored in the appropriate image database 420. When the user enters a statement that includes the new actor's name, the NLP component (e.g., FIG. 2, 210) associates the name TOM with an identical new core term, TOM, and sends that information to the graphics component (e.g., FIG. 2, 220). Anytime the user includes TOM in a sentence, the TOM graphic can be rendered in the resulting scene.

Pre-existing images can be altered by way of an image editor component 430. As with new graphics, pre-existing graphics can be replaced by changing color, texture, fabric patterns, sound, dimension, and the like. Replaced graphics can be stored as new graphics with new names or under their original names depending on user preferences. Any images saved to the image database(s) 420 can be accessed by a scene generator 440.

Figure 5:
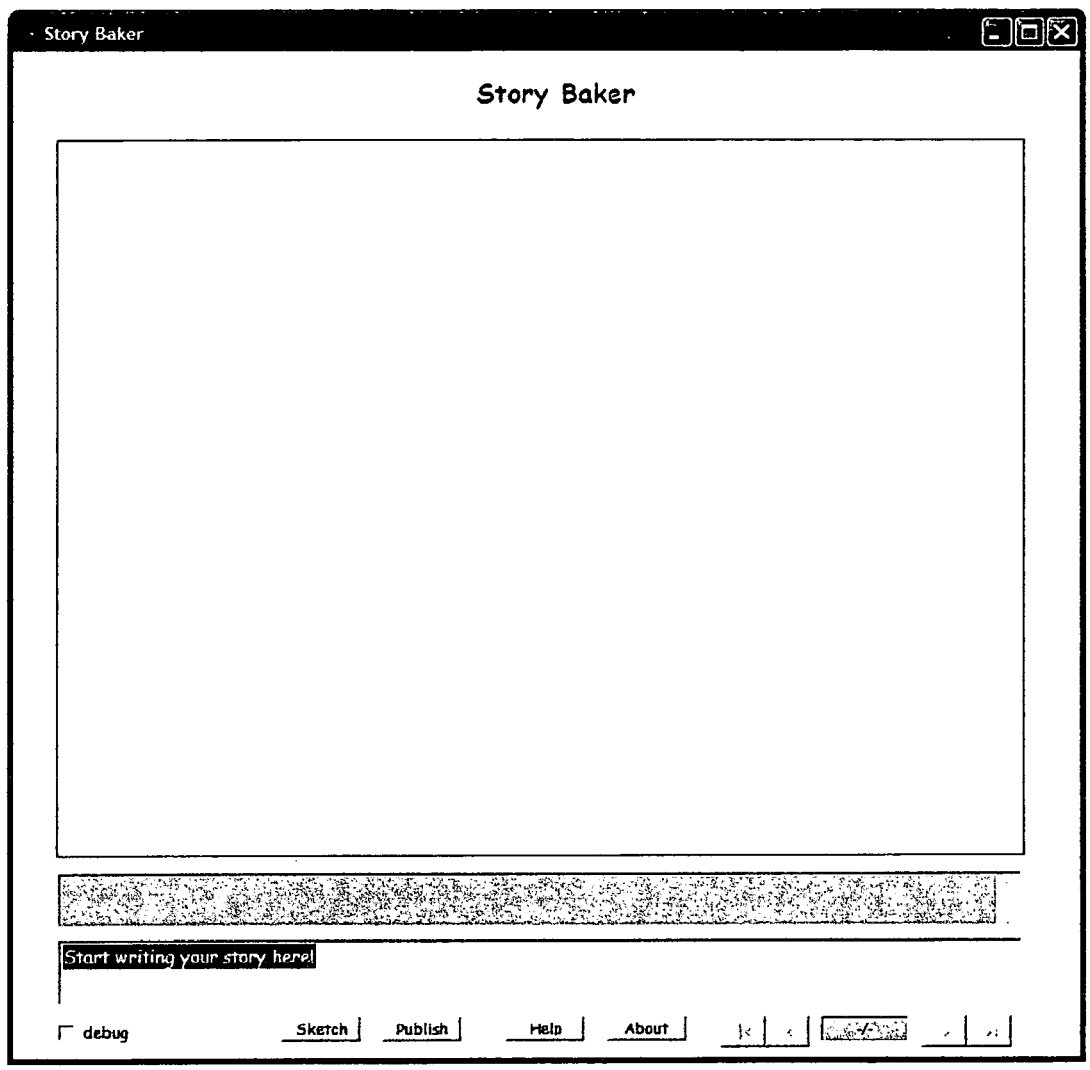
FIG. 5 illustrates an exemplary user interface of a natural language illustration system in accordance with an aspect of the subject invention.
Figure 6:
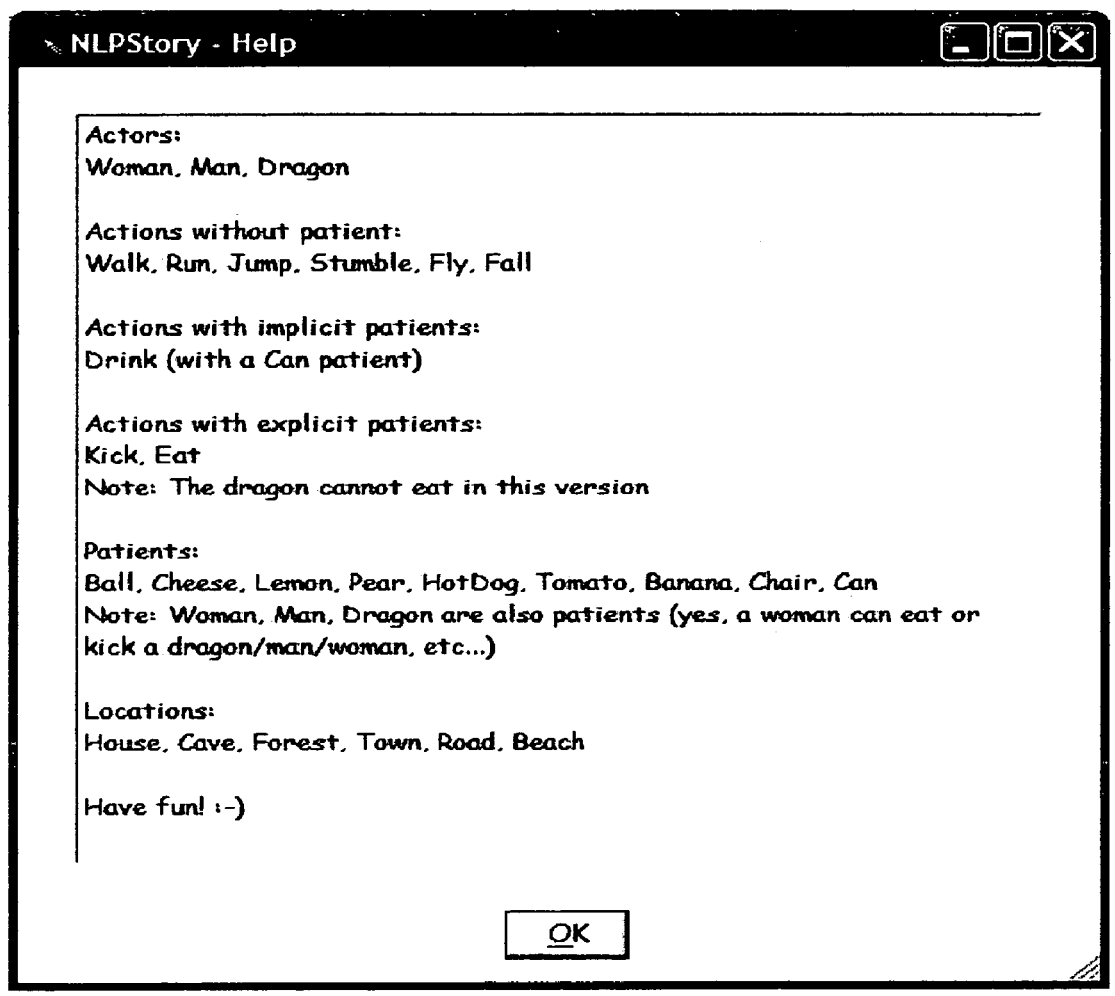
FIG. 6 illustrates an exemplary user interface of a HELP screen to assist a user when employing a natural language illustration system in accordance with an aspect of the subject invention.

Turning now to FIGS. 5-18, there is shown an exemplary sequence of screen captures demonstrating the employment of a dynamic natural language-to-illustration conversion system by a user as described in FIGS. 1-3, supra. FIG. 5 depicts an exemplary user interface 500 of the system when the system is launched. When assistance is needed before or during use of the system, a HELP screen 600 such as the one shown in FIG. 6 can be displayed to the user. The HELP screen 600 can include any or all of the terms for which graphics are associated (e.g., exist in the graphics library) as well as other tips or information to aid the user.

Figure 7:
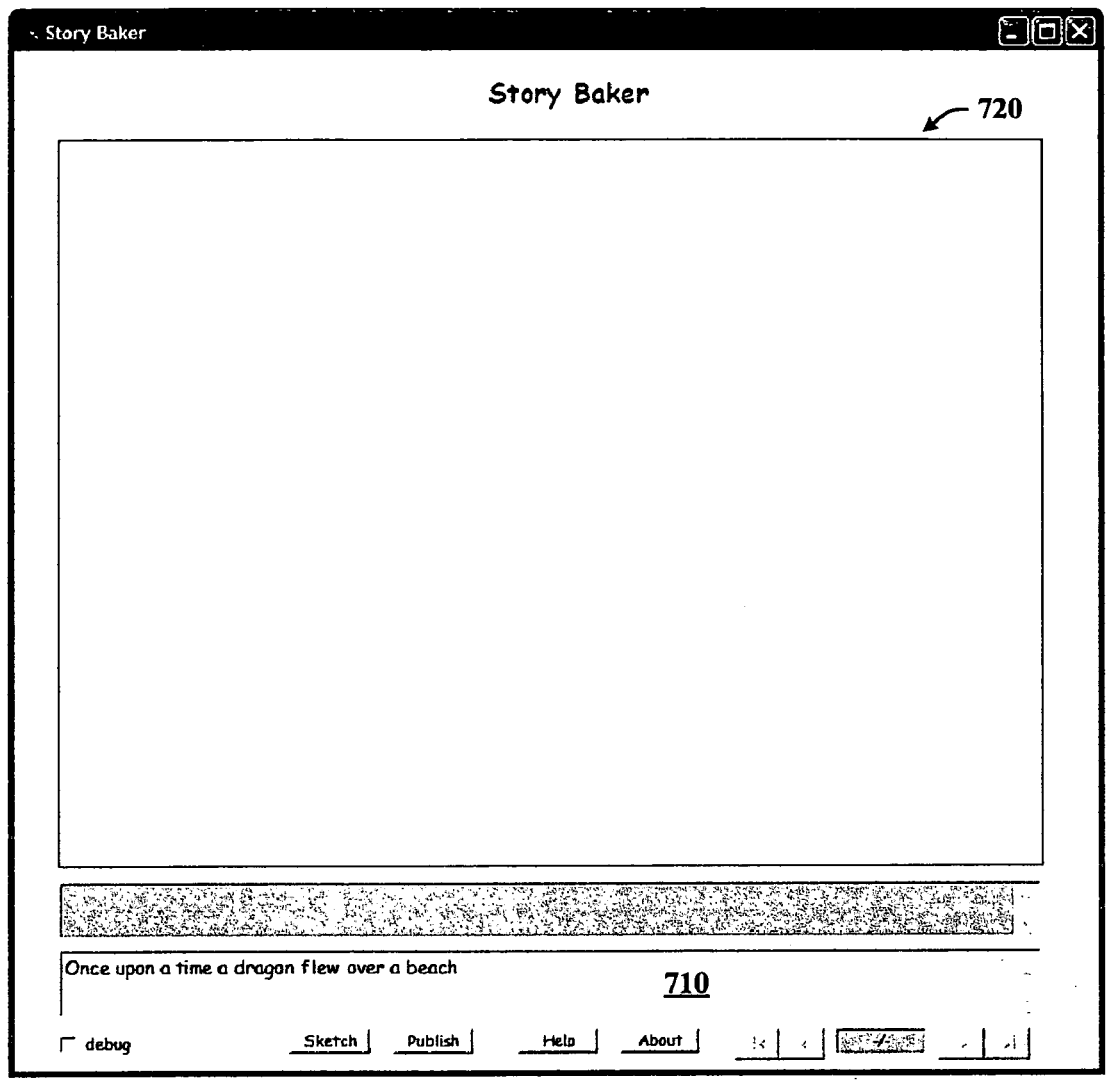
FIGS. 7-10 illustrate exemplary user interfaces that demonstrate a sequence of natural language input followed by a scene that corresponds with at least the most recent input in accordance with an aspect of the subject invention.
Figure 8:
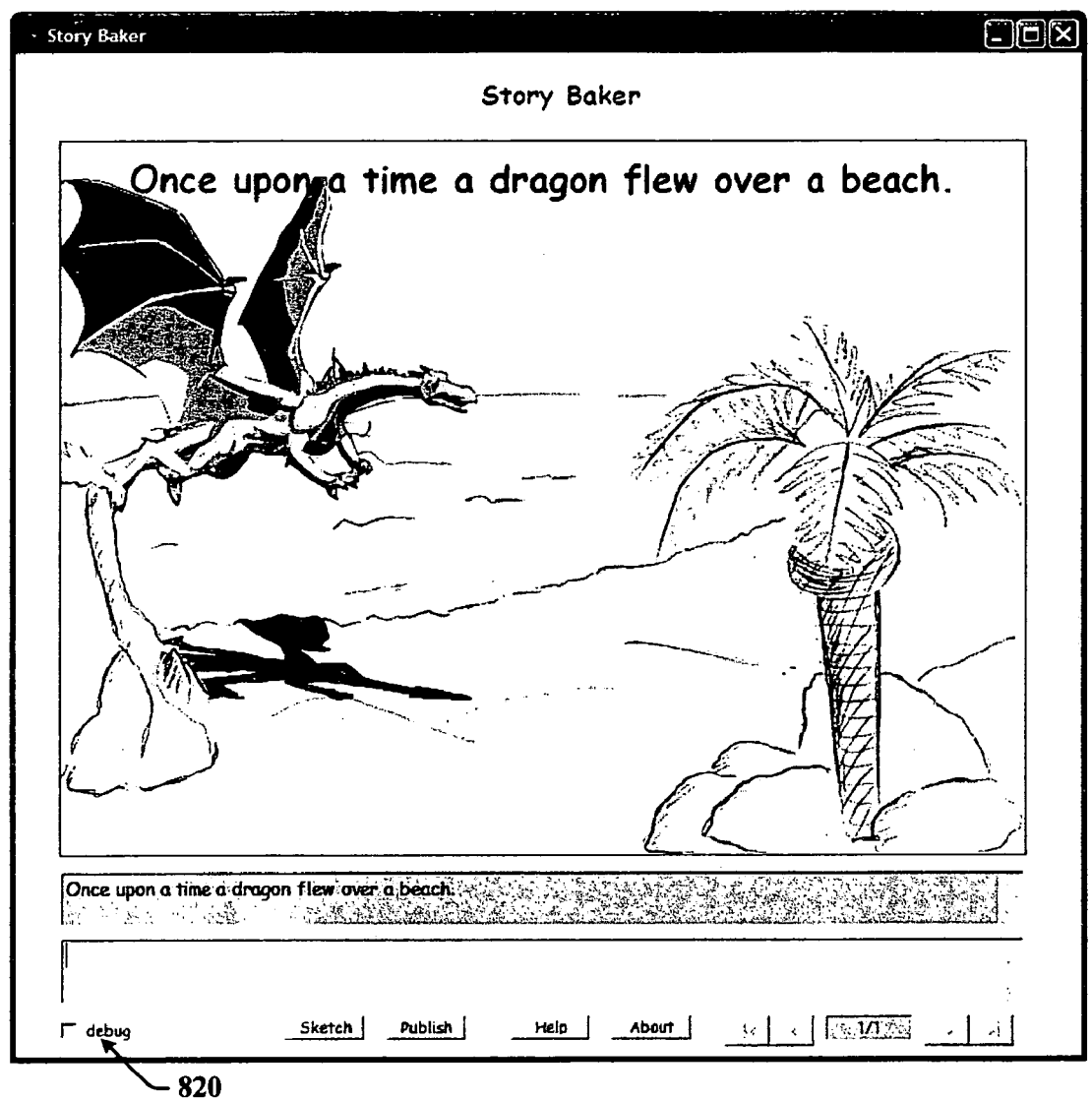

Now suppose that the user is ready to begin writing his story. As shown in FIG. 7, a first sentence 710 (sentence 1) is entered: Once upon a time a dragon flew over a beach. Note that as indicated in the figure, a period is not yet entered and no scene is rendered in the viewing window 720. After entering the period (end-of-sentence indicator), an animated scene of the dragon flying over a beach can be seen in the viewing window 810 as demonstrated in the screen capture 800 in FIG. 8. As a guide, the sentence being illustrated can be viewed in the window as well 810. To further assist the user in determining or learning how a scene is generated, the user can select a debug control 820 to view the actor, action, background, and/or object extracted from the user's sentence. According to the first sentence, dragon is the ACTOR, fly is the ACTION which is performed continuously in this case, and beach is the BACKGROUND or location.

Figure 9:
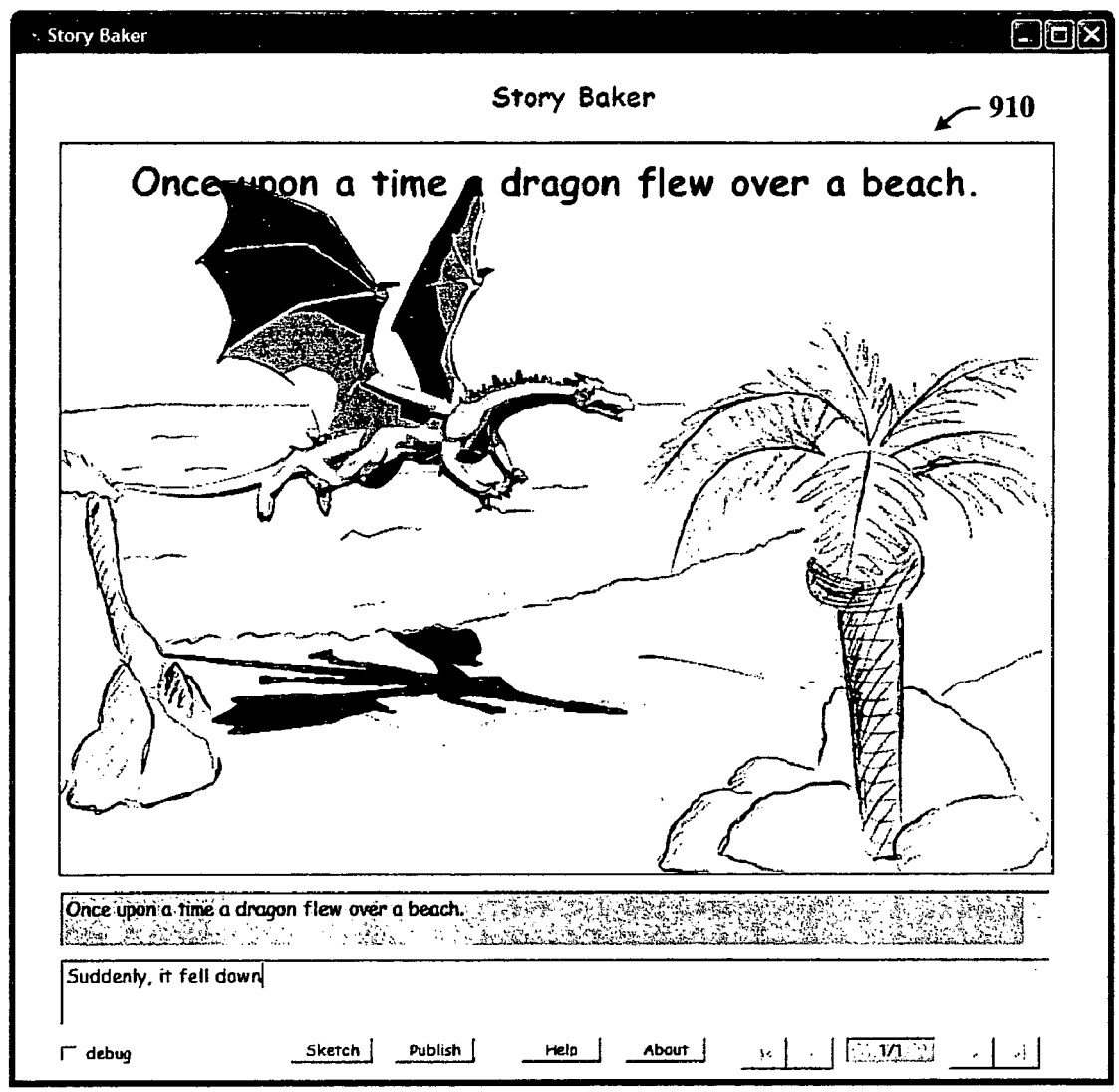
Figure 10:
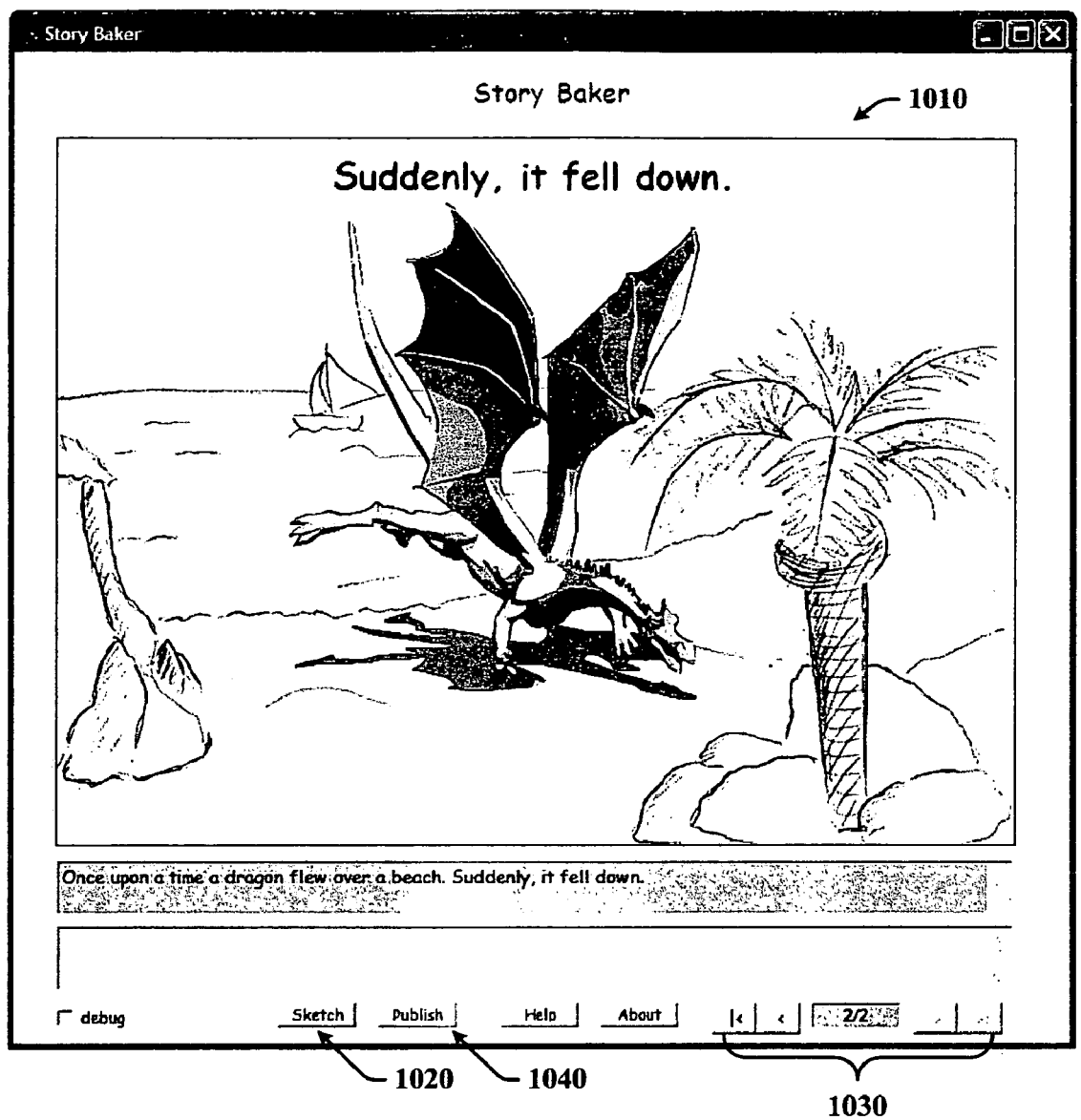
Figure 11:
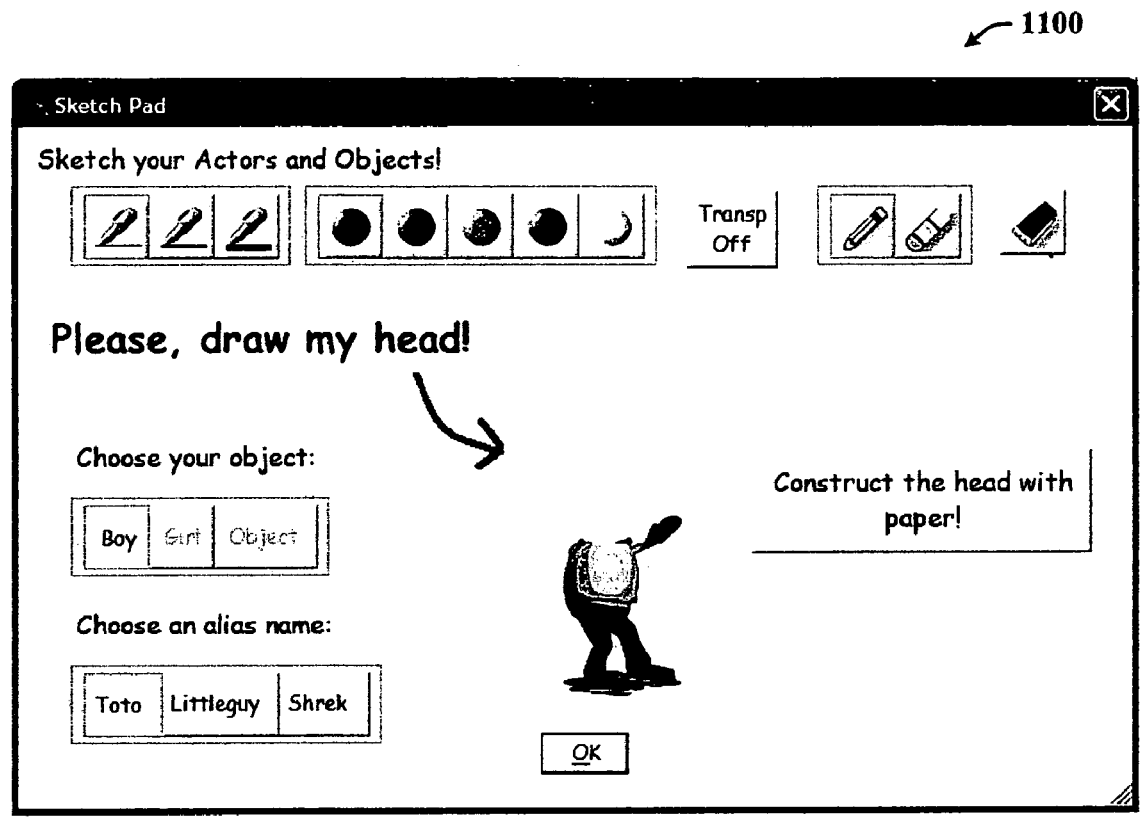
FIG. 11 illustrates an exemplary user interface employed to create new or replace existing actors in accordance with an aspect of the subject invention.

In FIG. 9, the scene from the previous sentence is still viewable in the window 910 as the user enters sentence 2—Suddenly, it fell down—in the appropriate field. As soon as the period is entered, the user can see an animation of the dragon falling down in the window 1010 (FIG. 10). Such action can occur continuously or a set number of times as defined by the user and/or by the particular term used (e.g., "fell"=1 time; "falling"=continuous).

Now imagine that the user would like to add a new actor graphic. To do so, the user can select a "sketch" or other similar control 1020. Other navigation related controls 1030 may be present as well to assist the user in viewing previous scenes or to see all the scenes in order from beginning to end (publish 1040).

Figure 12:
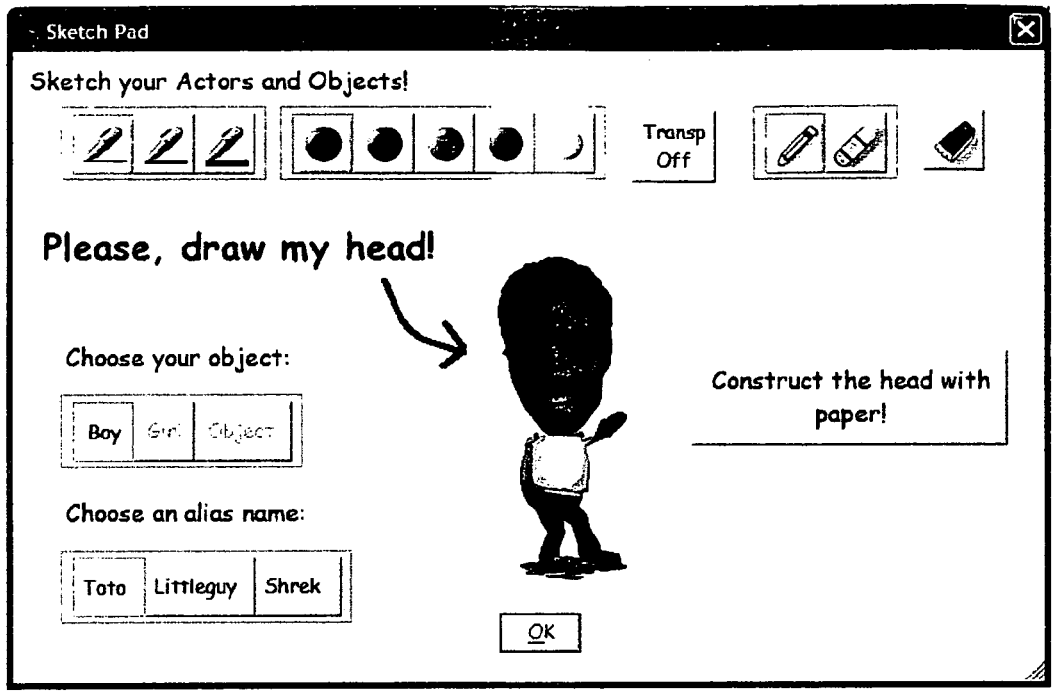
FIG. 12 illustrates an exemplary user interface employed to create new or replace existing actors in accordance with an aspect of the subject invention.
Figure 12:
Figure 12:
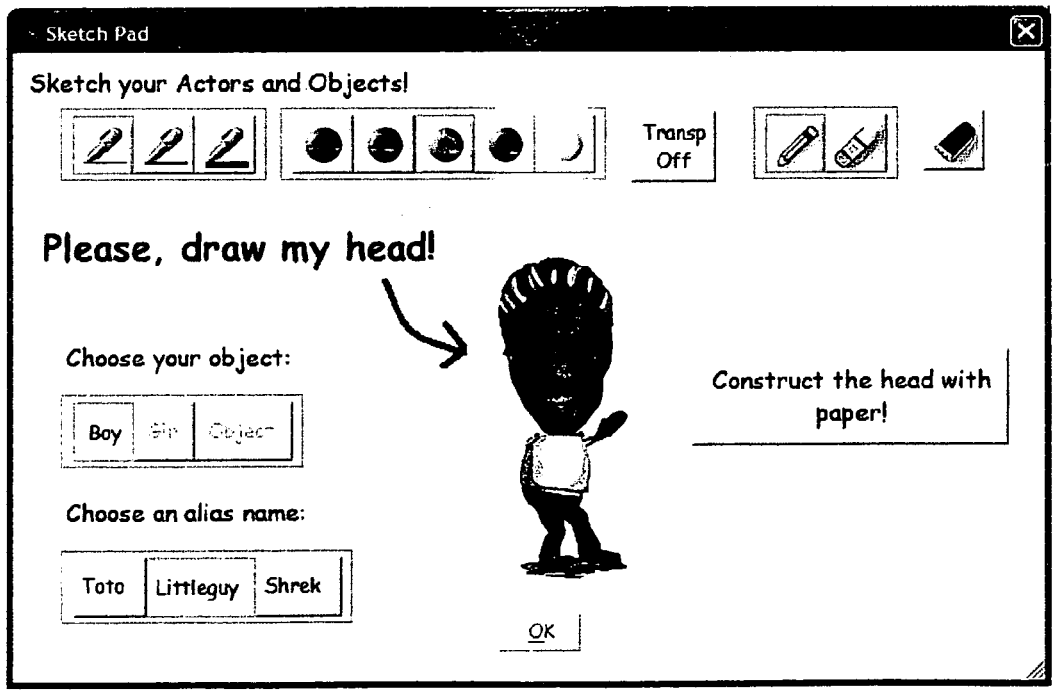

When the sketch control 1020 is selected, a new window 1100 can be opened to display a plurality of image templates as well as other controls that facilitate the creation of the custom image. In this instance, the user is creating a custom boy (male) actor named Littleguy. Because the user is making use of the boy actor template, the user only is asked to fill in the head portion of the actor. The rest of the body appears and behaves in a default manner. As shown in FIG. 12, it appears that the user has imported (e.g., cut-pasted, drag-drop) a photo of a person's head and face and then manually added further detail to the hair to complete Littleguy's custom appearance. Once the user clicks "OK", the image of Littleguy is saved to the graphics library or database.

Figure 13:
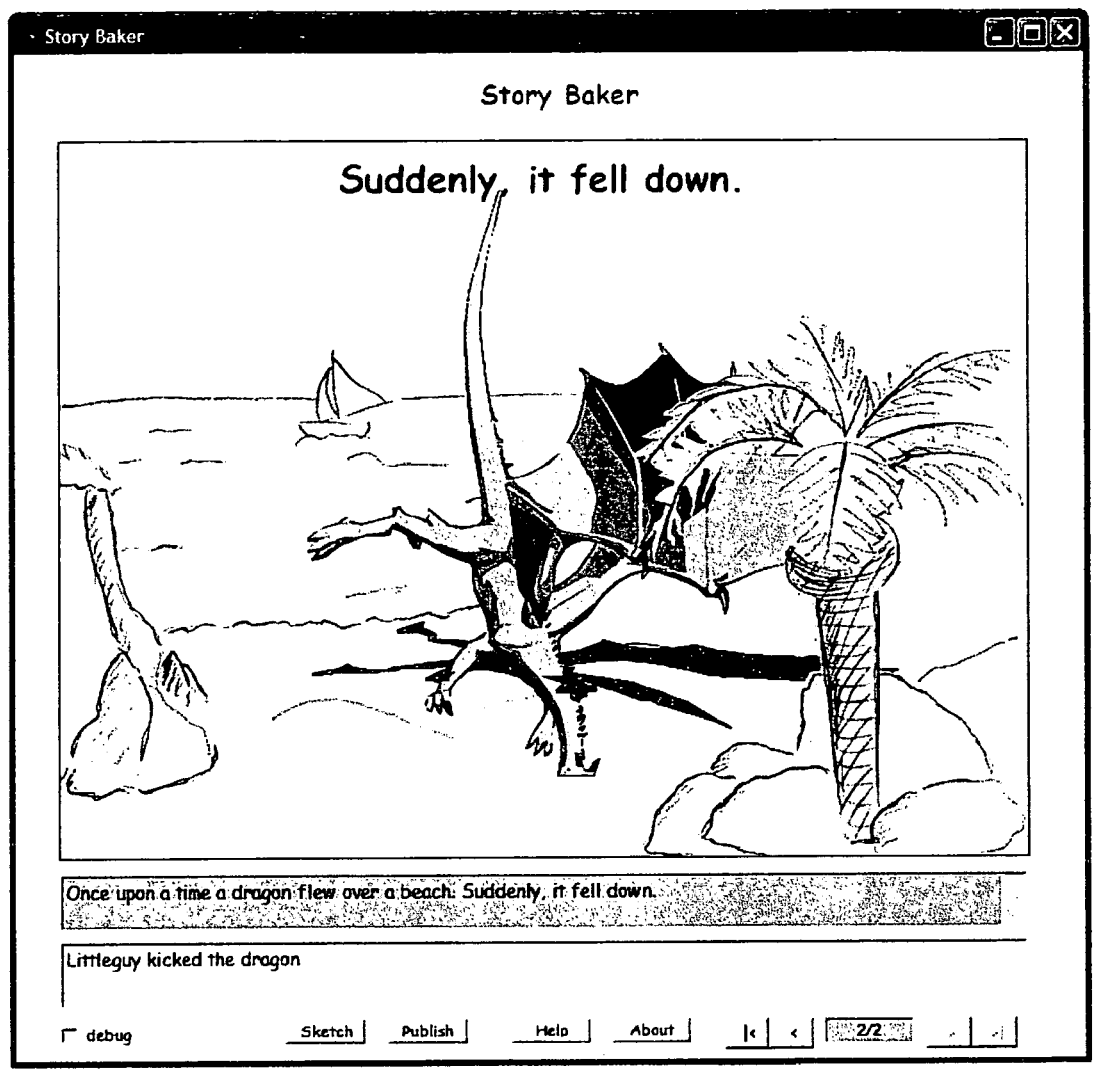
FIGS. 13-18 illustrate exemplary user interfaces that demonstrate a sequence of natural language input followed by a scene that corresponds with at least the most recent input in accordance with an aspect of the subject invention.
Figure 14:
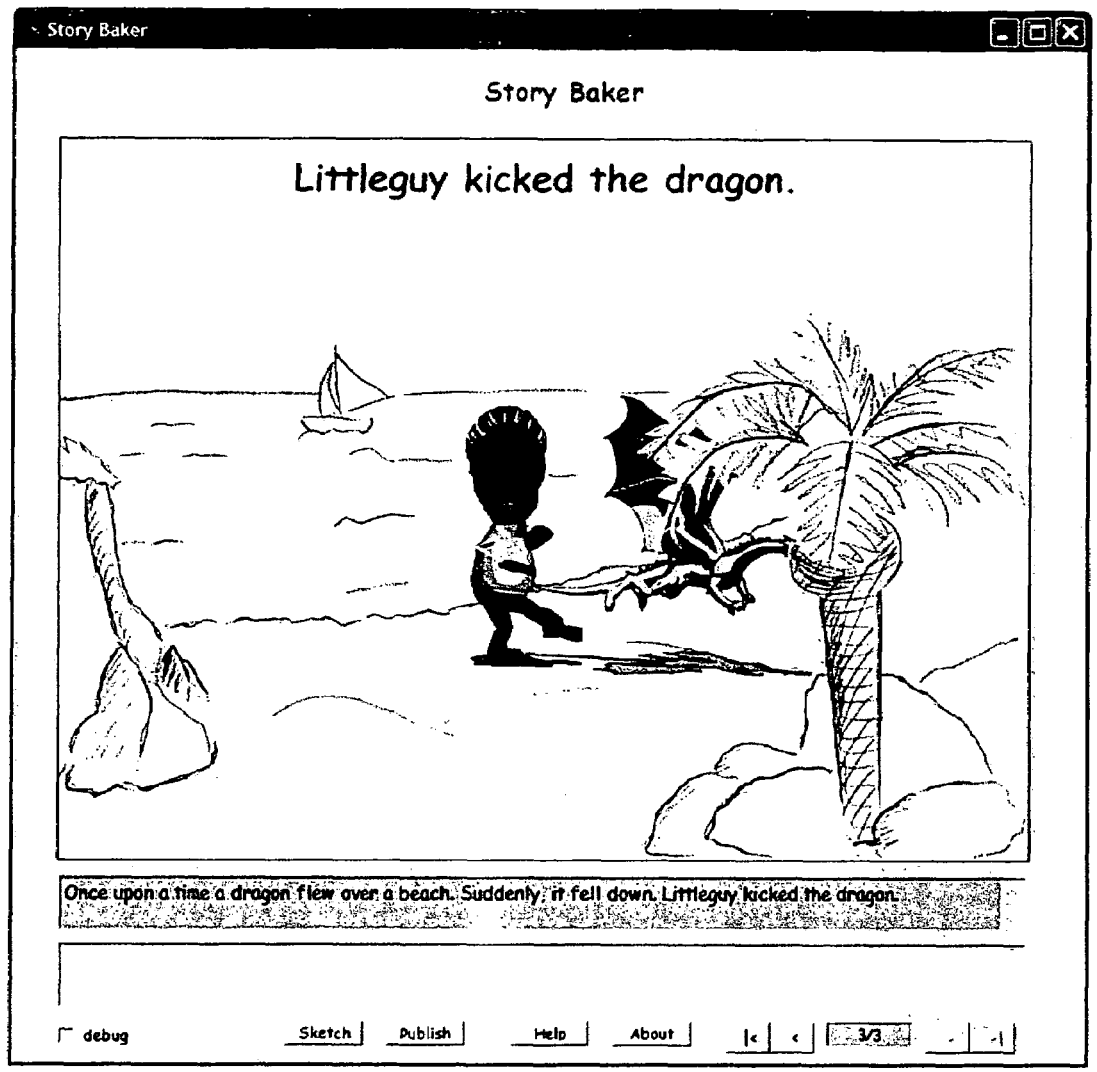
Figure 15:
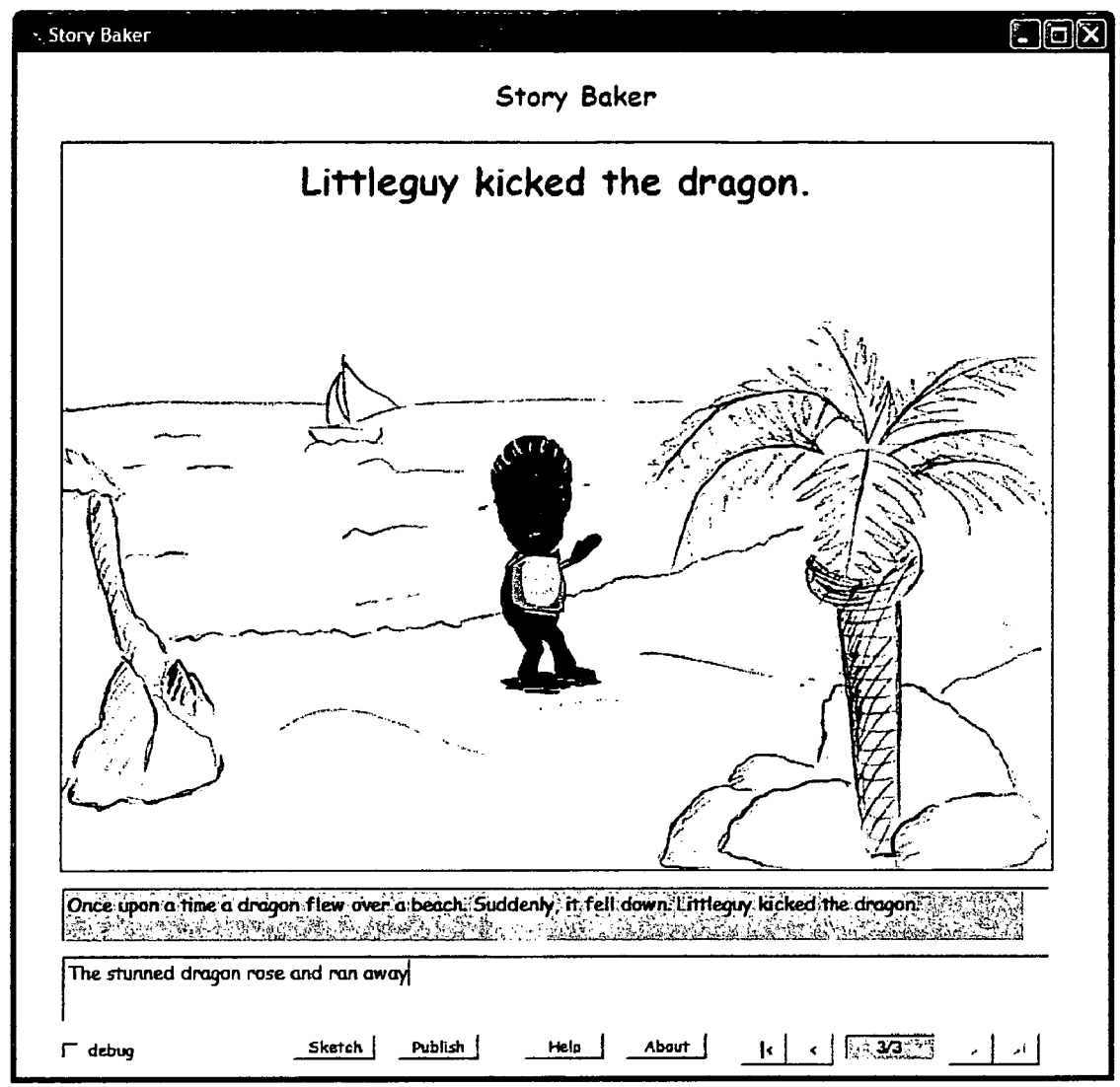
Figure 16:
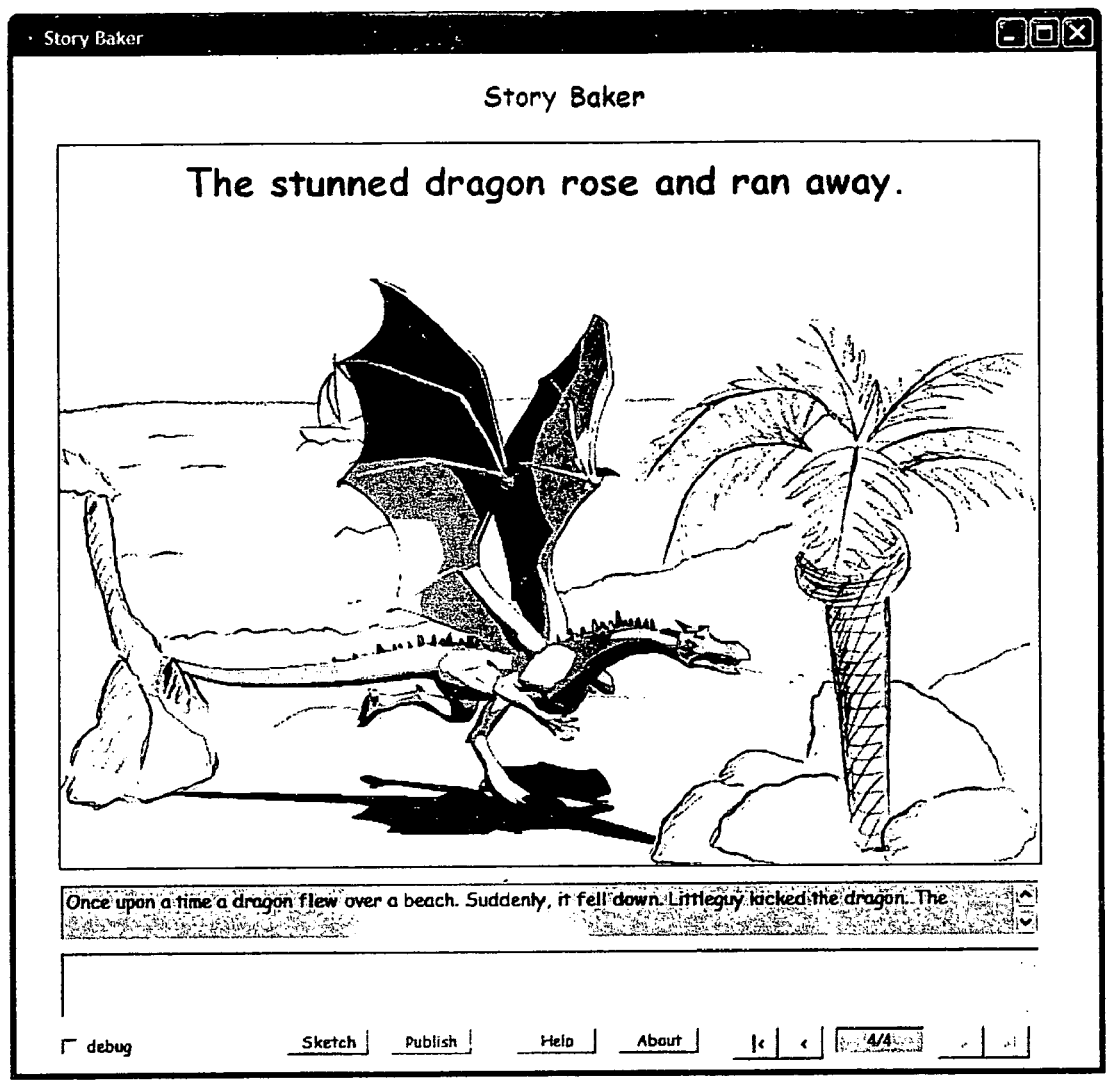
Figure 17:
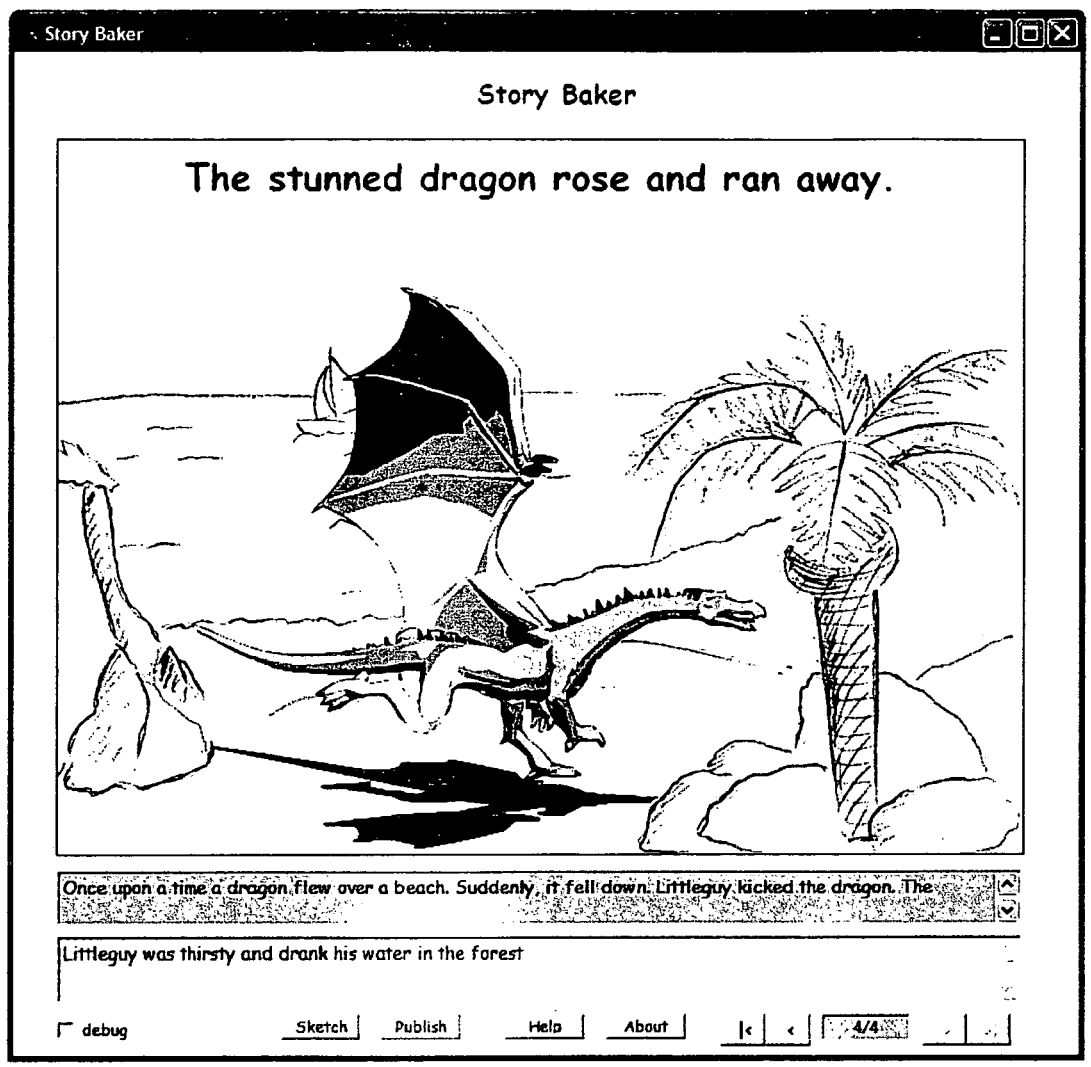
Figure 18:
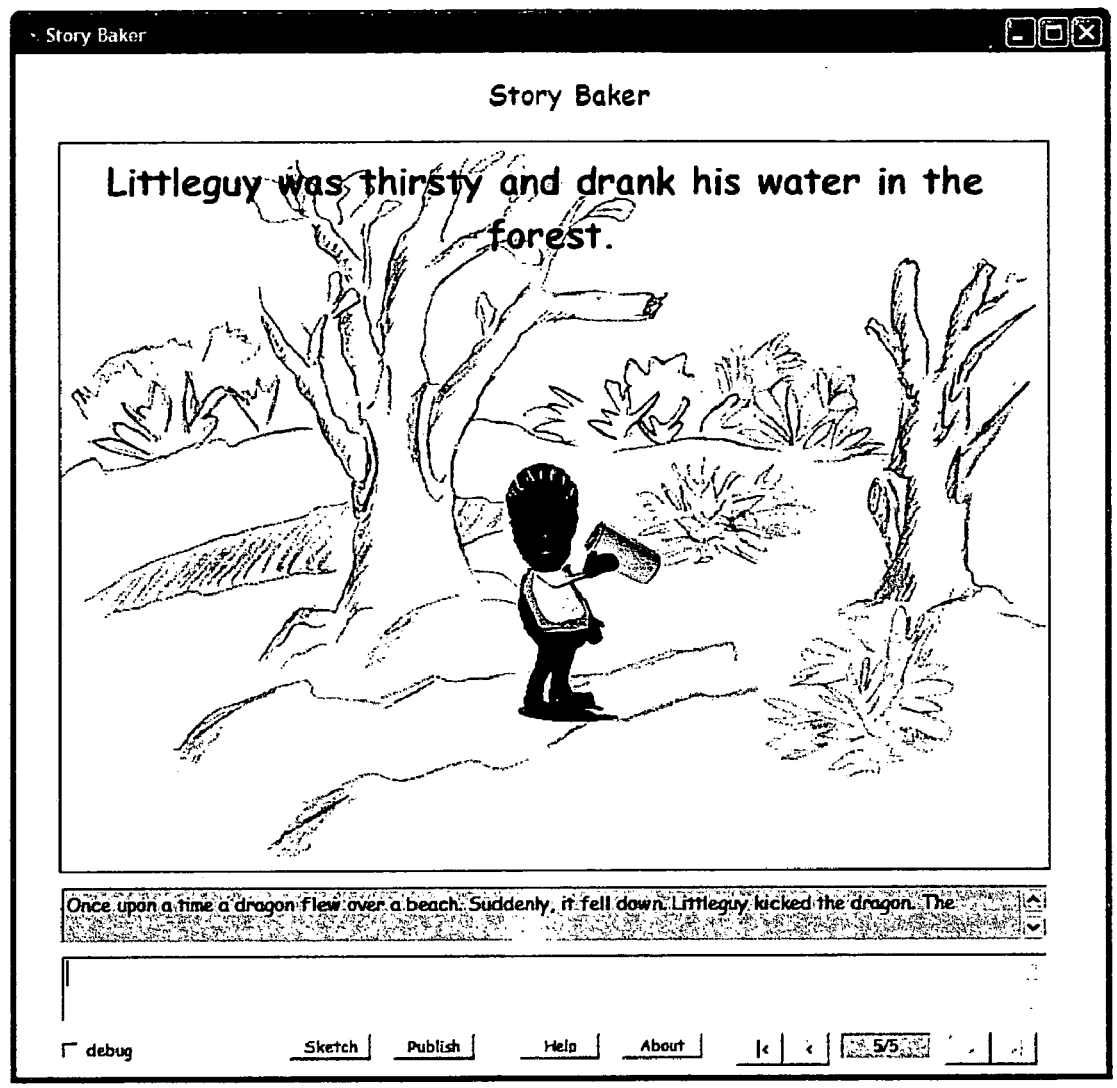

Continuing on with the story that began in FIG. 7, the user is entering his third sentence (sentence 3)—Littleguy kicked the dragon—in the appropriate field in FIG. 13. As soon as the period is entered, the user can see animation of Littleguy kicking the dragon in FIG. 14. The user continues with sentence 4—The stunned dragon rose and ran away as shown in FIG. 15 and animated in FIG. 16. In FIG. 17, the user enters his last sentence—Littleguy was thirsty and drank his water in the forest. Once again, after entering the period, the animation of Littleguy drinking in the forest is shown (FIG. 18).

Figure 19:
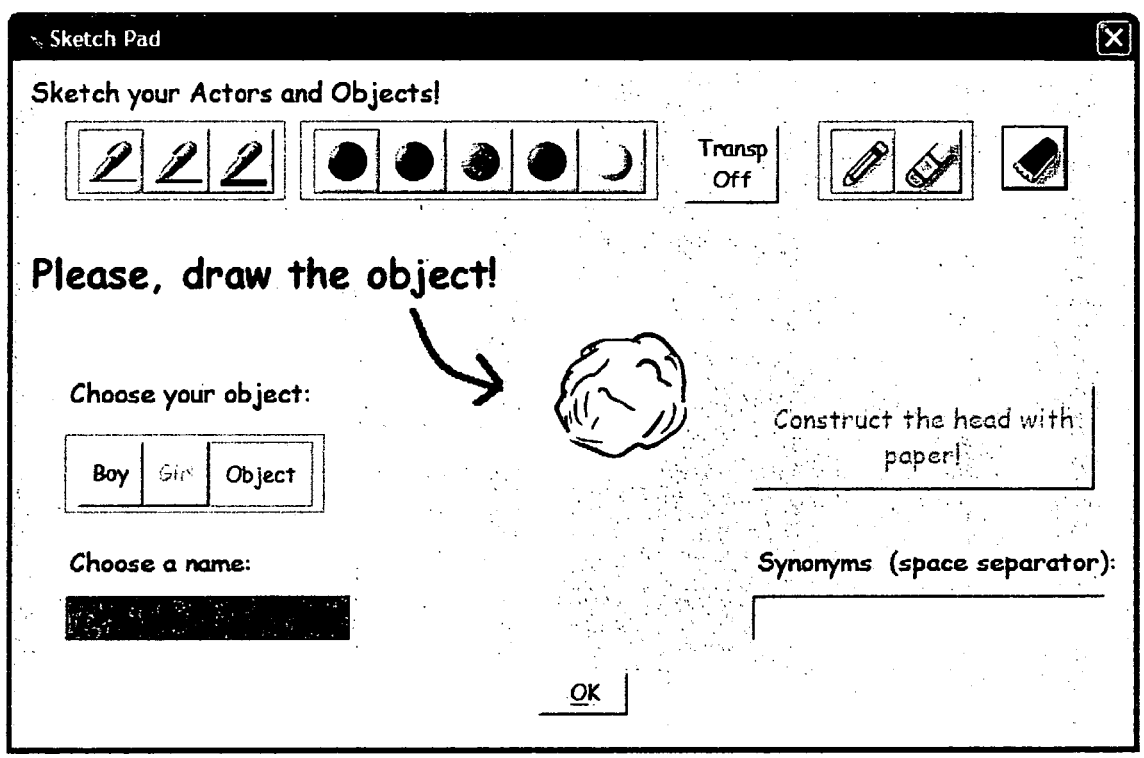
FIG. 19 illustrates an exemplary user interface employed to sketch new or replace existing functional objects or items in accordance with an aspect of the subject invention.
Figure 20:
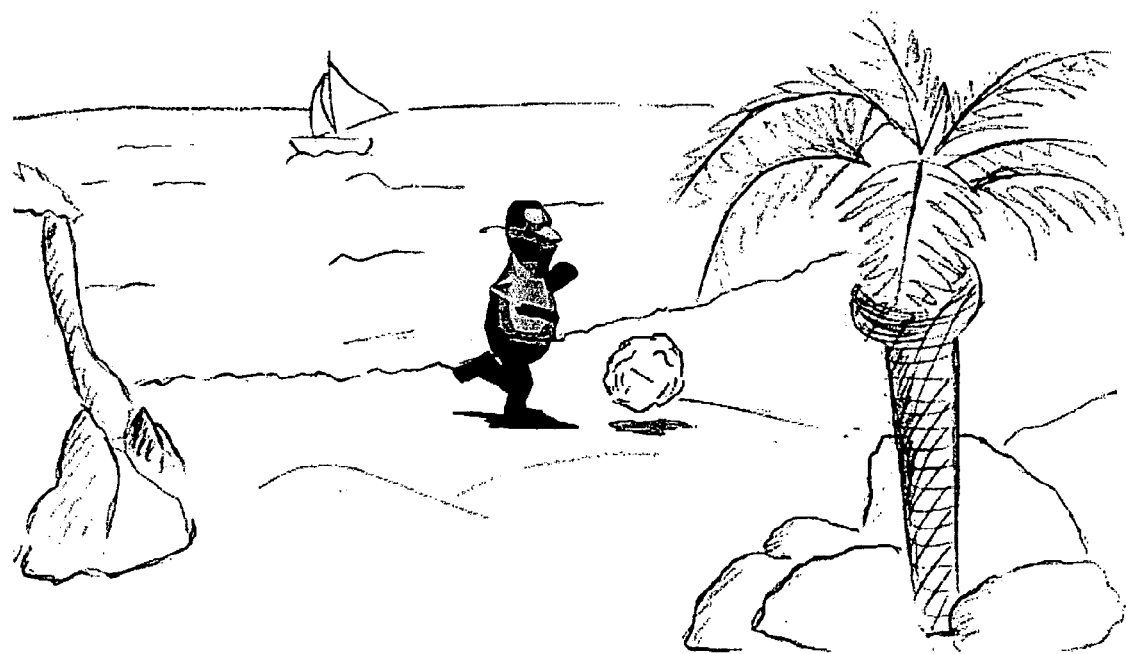
FIG. 20 illustrates a screen capture of an exemplary animated scene that makes use of the newly sketched object from FIG. 19 in accordance with an aspect of the subject invention.

As previously mentioned, new actor images can be created using a sketch feature or pad. In some cases, an appropriate template can be selected and employed to assist in the creation of new images. Alternatively, new images (or graphics) can be created without the use of a template (e.g., from scratch). For example, FIG. 19 illustrates an exemplary user interface for drawing new object images. In this case, a user has drawn an image named "rock". When the term "rock" is entered by the user such as "The man kicked the rock", a scene as illustrated in FIG. 20 can result.

Various methodologies in accordance with the subject invention will now be described via a series of acts, it is to be understood and appreciated that the subject invention is not limited by the order of acts, as some acts may, in accordance with the subject invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

Figure 21:
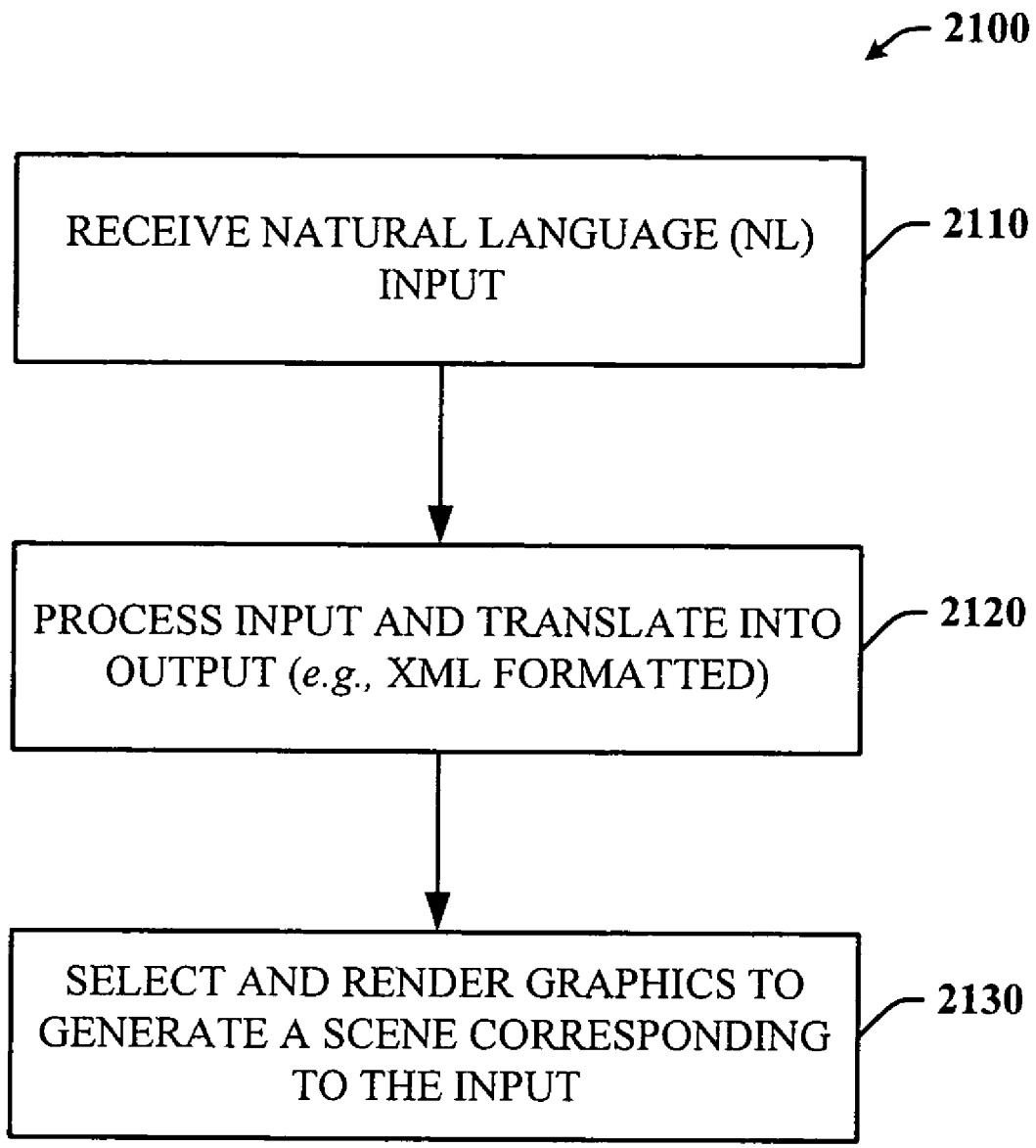
FIG. 21 is a flow chart demonstrating an exemplary methodology that facilitates generating illustrations in an instant manner from natural language input in accordance with an aspect of the subject invention.

Referring now to FIG. 21, there is a flow diagram of an exemplary method 2100 that facilitates linking graphics with natural language input to instantly render a scene. The method 2100 involves receiving natural language input from a user at 2110. The input can be in sentence form that is typed, written (e.g., tablet PC), or spoken (e.g., speech-to-text conversion) by the user. More importantly, the input does not need to be coded or arranged in any particular order, but rather can follow natural language patterns for any language supported by the method 2100.

At 2120, the natural language input can be processed such as by using natural language processing techniques to yield a logical form of the input. The logical form can then be translated into output that is usable and understandable by a graphics selection engine. XML format is one such example. At 2130, the XML formatted output can be employed to select and render the appropriate graphics (from a graphics library or database) to generate a scene corresponding to the user's initial input.

Figure 22:
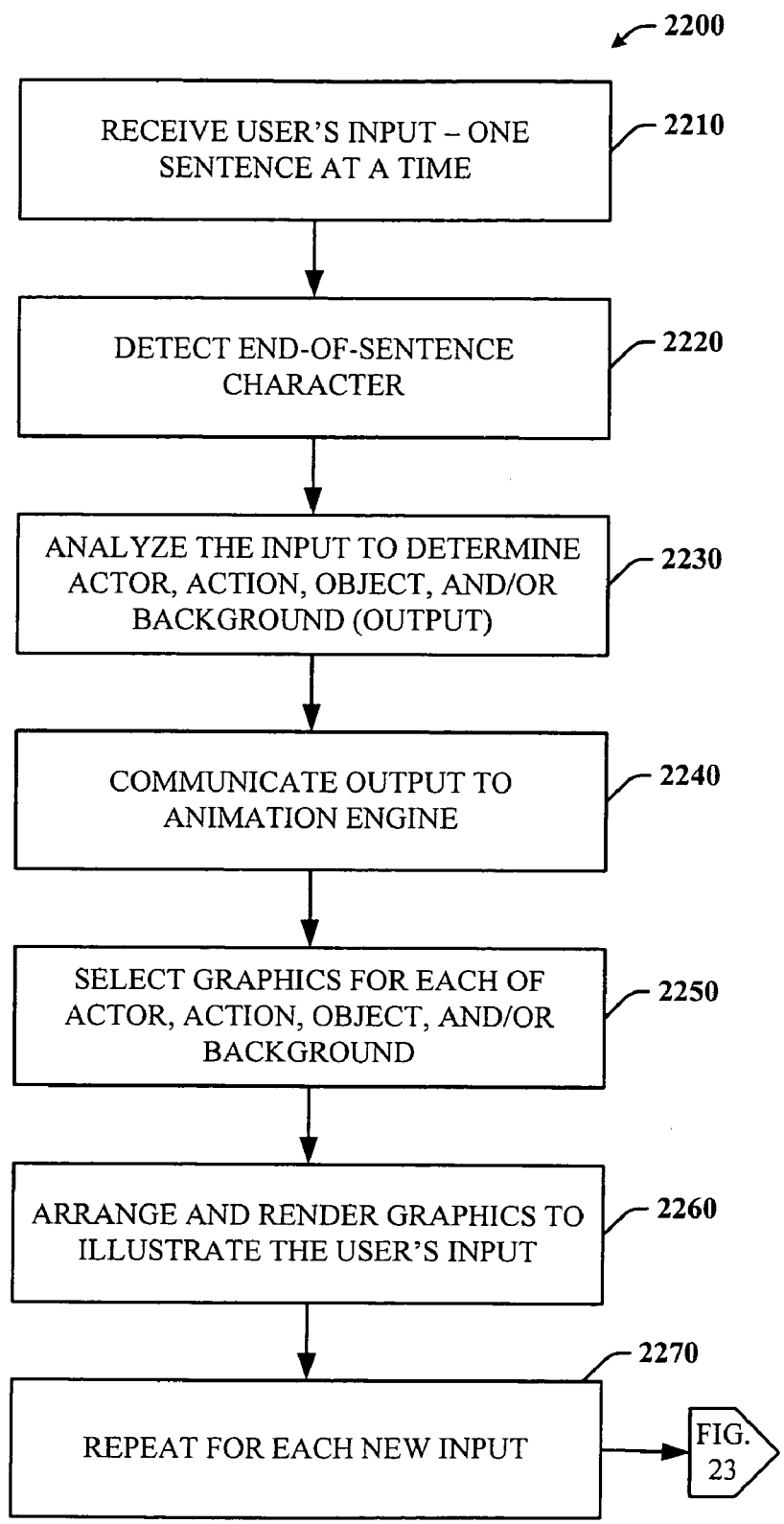
FIG. 22 is a flow chart demonstrating an exemplary methodology that facilitates creating an illustrated story corresponding to natural language input in accordance with an aspect of the subject invention.

Referring now to FIG. 22, there is shown a flow diagram of an exemplary method 2200 that facilitates generating scenes which correspond to and illustrate a user's natural language input. The method 2200 involves receiving the user's input in sentence form to generate one scene per sentence such as one sentence at a time (at 2210). At 2220, an end-of-sentence indicator such as a period or hard return (e.g., hitting "Enter) can be detected. Once detected, the input can be analyzed to determine the actor, action, object, and/or background (output) specified in the input at 2230.

At 2240, the output can be communicated to an animation engine, which can select a graphic for each of the actor, action, object, and/or background specified in the input (at 2250). At 2260, the selected graphics can be arranged and rendered to illustrate the user's natural language input. The previous can be repeated (beginning with 2210) at 2270 for each new input (e.g., sentence) received from the user.

Figure 23:
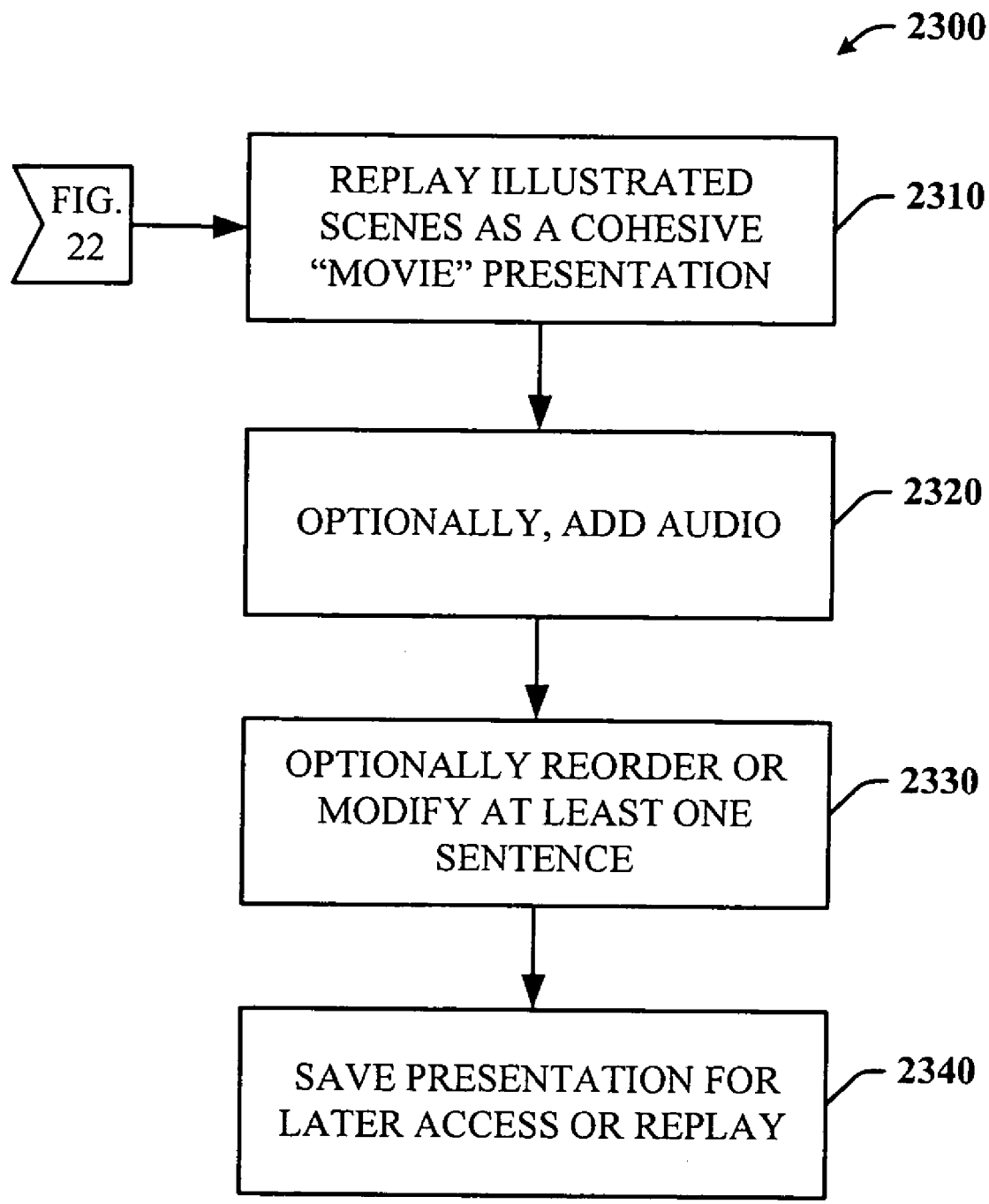
FIG. 23 is a flow chart illustrating an exemplary methodology that facilitates viewing, modifying, and/or storing a story created by the method of FIG. 20 in accordance with an aspect of the subject invention.

When no additional input is desired, the method can proceed to the method 2300 in FIG. 23. The method 2300 involves replaying the series of illustrated scenes in the order in which they were created as a cohesive movie-like presentation (2310). Each scene can include animation and color and appear in 2-D or 3-D space. At 2320, audio can be added to the presentation and/or to individual scenes of the presentation. In addition, should the user wish to change some portion of the story, at least one scene can be modified or reordered by moving the corresponding text to its new position or by changing the appropriate words in any one sentence. The presentation can be "reassembled" and then saved for later access or replay at 2340.

Figure 24:
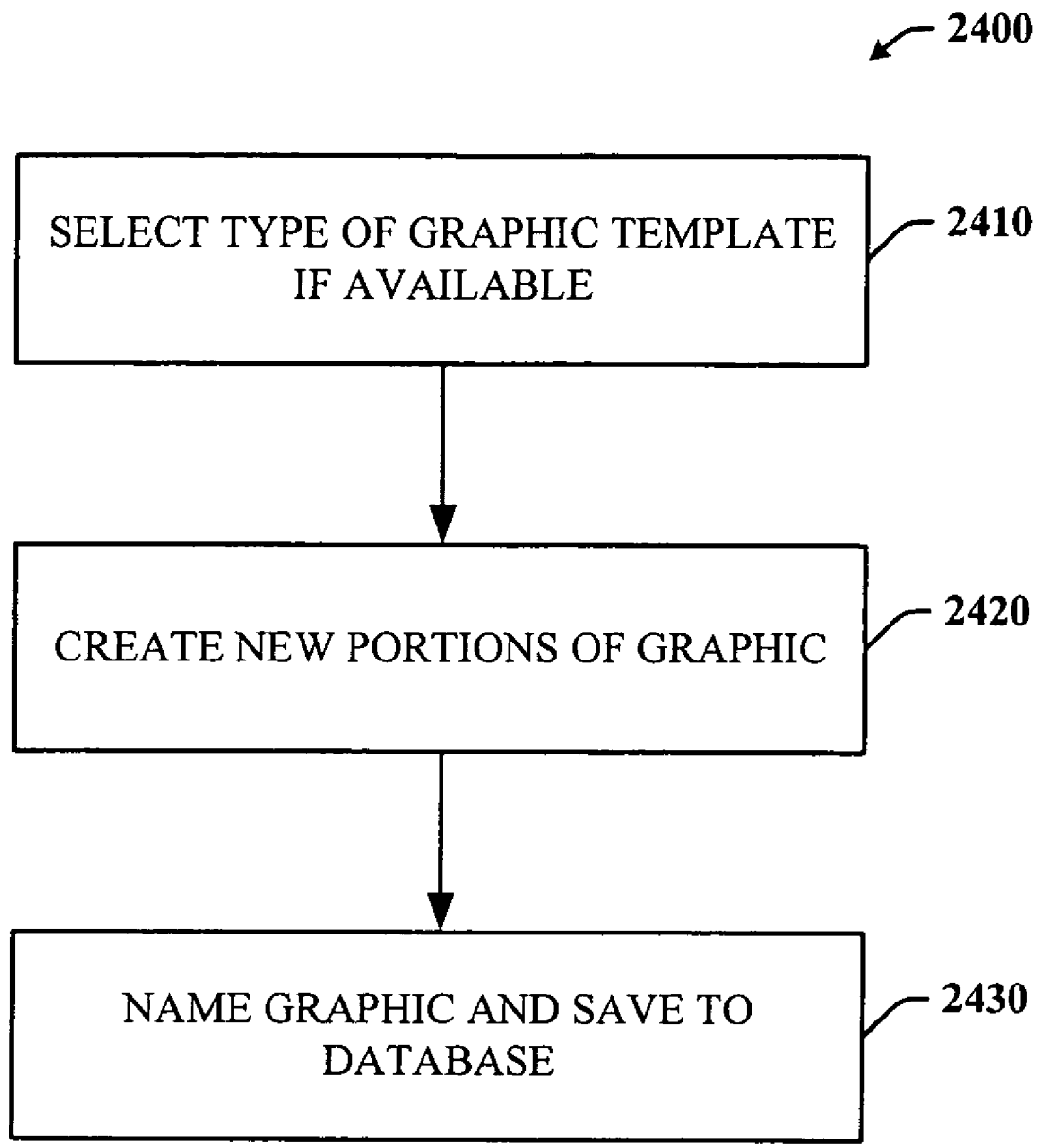
FIG. 24 is a flow chart illustrating an exemplary methodology that facilitates creating new graphics and associating them with words for use in generating instant scenes based on natural language input in accordance with an aspect of the subject invention.

Turning now to FIG. 24, there is illustrated a flow diagram of an exemplary graphics creation method 2400 that facilitates expanding and customizing the graphics library from which graphics can be selected to generate scenes as described hereinabove. The method 2400 involves selecting a type of graphic template at 2410, if available. For example, when the user wants to create a new male actor that resembles a friend, the user can select a male actor template or skeleton. At 2420, the relevant new portions of the male actor can be created by the user. This can be accomplished in part by dragging and dropping or importing images such as photos or drawings created elsewhere onto the respective portion of the template. The user can also draw directly on the template in the appropriate locations such as by using pen and ink technology (tablet PC).

In practice, the male actor template may only require the user to add in the head and face portions. Other templates may allow for body portions to be modified or created from scratch. At 2430, the new graphic can be named and saved to the appropriate graphics database or library. Once the graphic is named, the graphic will be rendered whenever that particular name or synonyms thereof are recognized as being any one of an actor, action, object, and/or background specified in the user's natural language input.

Figure 25:
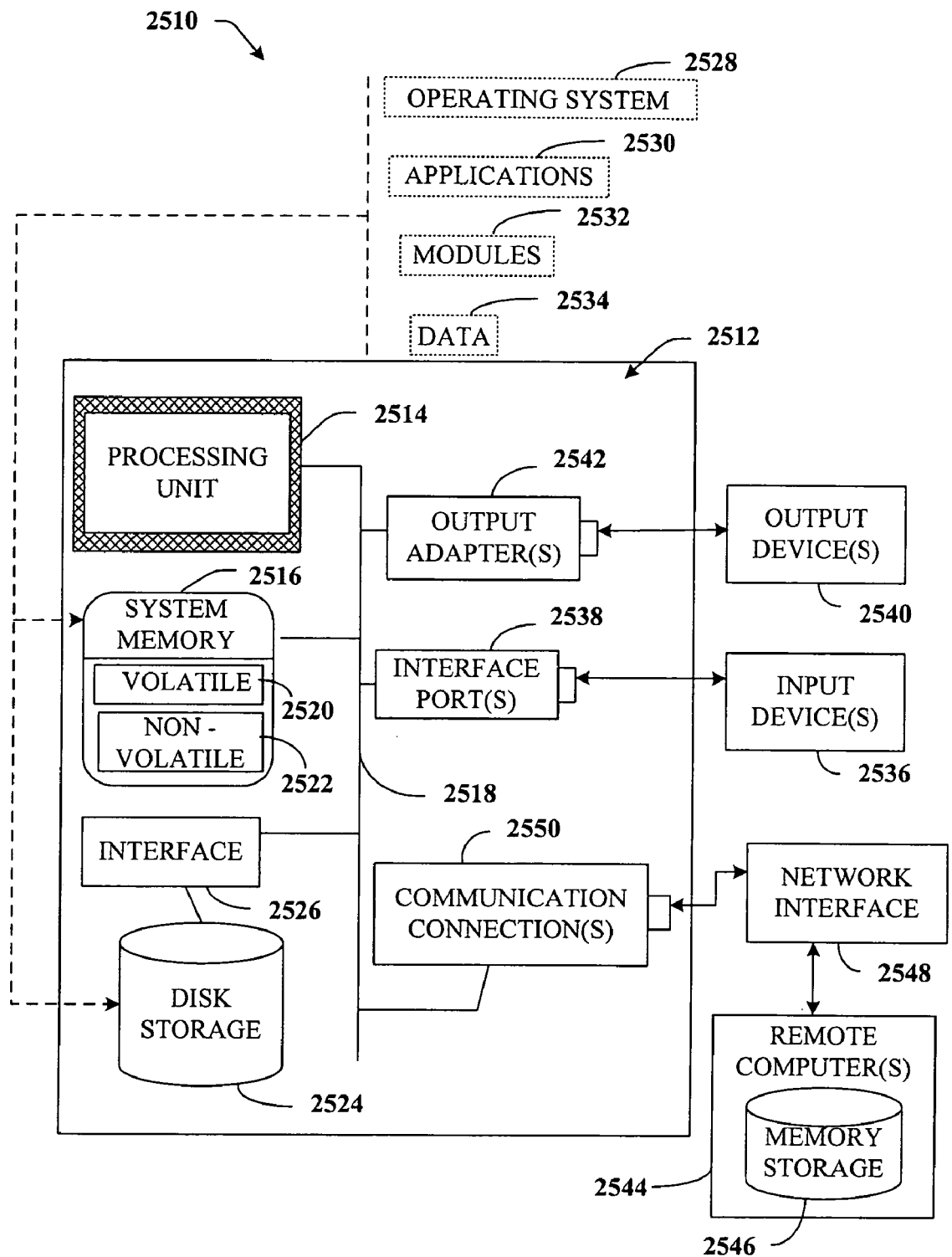
FIG. 25 illustrates an exemplary environment for implementing various aspects of the invention.

In order to provide additional context for various aspects of the subject invention, FIG. 25 and the following discussion are intended to provide a brief, general description of a suitable operating environment 2510 in which various aspects of the subject invention may be implemented. While the invention is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 2510 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 25, an exemplary environment 2510 for implementing various aspects of the invention includes a computer 2512. The computer 2512 includes a processing unit 2514, a system memory 2516, and a system bus 2518. The system bus 2518 couples system components including, but not limited to, the system memory 2516 to the processing unit 2514. The processing unit 2514 can be any of various available processors. Dual microprocessors and other multiprocessor architectures also can be employed as the processing unit 2514.

The system bus 2518 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 2516 includes volatile memory 2520 and nonvolatile memory 2522. The basic input/output system (BIOS), containing the basic routines to transfer information between elements within the computer 2512, such as during start-up, is stored in nonvolatile memory 2522. By way of illustration, and not limitation, nonvolatile memory 2522 can include read only memory (ROM), programmable ROM (PROM), electrically programmable ROM (EPROM), electrically erasable ROM (EEPROM), or flash memory. Volatile memory 2520 includes random access memory (RAM), which acts as external cache memory. By way of illustration and not limitation, RAM is available in many forms such as static RAM (SRAM), dynamic RAM (DRAM), static DRAM (SDRAM), double data rate SDRAM (DDR SDRAM), enhanced SDRAM (ESDRAM), Synchlink DRAM (SLDRAM), and direct Rambus (DRDRAM).

Computer 2512 also includes removable/nonremovable, volatile/nonvolatile computer storage media. FIG. 25 illustrates, for example, a disk storage 2524. Disk storage 2524 includes, but is not limited to, devices like a magnetic disk drive, floppy disk drive, tape drive, Jaz drive, Zip drive, LS-100 drive, flash memory card, or memory stick. In addition, disk storage 2524 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 2524 to the system bus 2518, a removable or non-removable interface is typically used such as interface 2526.

It is to be appreciated that FIG. 25 describes software that acts as an intermediary between users and the basic computer resources described in suitable operating environment 2510. Such software includes an operating system 2528. Operating system 2528, which can be stored on disk storage 2524, acts to control and allocate resources of the computer system 2512. System applications 2530 take advantage of the management of resources by operating system 2528 through program modules 2532 and program data 2534 stored either in system memory 2516 or on disk storage 2524. It is to be appreciated that the subject invention can be implemented with various operating systems or combinations of operating systems.

A user enters commands or information into the computer 2512 through input device(s) 2536. Input devices 2536 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2514 through the system bus 2518 via interface port(s) 2538. Interface port(s) 2538 include, for example, a serial port, a parallel port, a game port, and a universal serial bus (USB). Output device(s) 2540 use some of the same type of ports as input device(s) 2536. Thus, for example, a USB port may be used to provide input to computer 2512 and to output information from computer 2512 to an output device 2540. Output adapter 2542 is provided to illustrate that there are some output devices 2540 like monitors, speakers, and printers among other output devices 2540 that require special adapters. The output adapters 2542 include, by way of illustration and not limitation, video and sound cards that provide a means of connection between the output device 2540 and the system bus 2518. It should be noted that other devices and/or systems of devices provide both input and output capabilities such as remote computer(s) 2544.

Computer 2512 can operate in a networked environment using logical connections to one or more remote computers, such as remote computer(s) 2544. The remote computer(s) 2544 can be a personal computer, a server, a router, a network PC, a workstation, a microprocessor based appliance, a peer device or other common network node and the like, and typically includes many or all of the elements described relative to computer 2512. For purposes of brevity, only a memory storage device 2546 is illustrated with remote computer(s) 2544. Remote computer(s) 2544 is logically connected to computer 2512 through a network interface 2548 and then physically connected via communication connection 2550. Network interface 2548 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 2550 refers to the hardware/software employed to connect the network interface 2548 to the bus 2518. While communication connection 2550 is shown for illustrative clarity inside computer 2512, it can also be external to computer 2512. The hardware/software necessary for connection to the network interface 2548 includes, for exemplary purposes only, internal and external technologies such as, modems including regular telephone grade modems, cable modems and DSL modems, ISDN adapters, and Ethernet cards.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A natural language illustration system comprising:
   a language processor component that analyzes natural language input that comprises at least one action from a user to determine a logical form of the input and translates the logical form into an output, the output comprising at least one of an actor, action, object, and background, wherein the natural language input comprises a plurality of sentences; and
   an animation engine that selects at least one image, applies at least one template to the at least one image and generates for each sentence an animation dynamically based on the at least one image and the at least one template, wherein each animation is linked to the sentence for which the animation was generated and conveys the meaning of the sentence, the animation engine arranges the animations in a same order as the sentences are provided in the natural language input and playing the animations in order to simulate a movie, wherein upon the user changing the order of the sentences the animation engine changes the order of the animations to match the changed order of the sentences without re-analyzing the natural language input and without generating new animations.

2. The system of claim 1, wherein the language processor component is a natural language processor component that comprises a natural language processor module that processes the natural language input to determine the logical form of the input.

3. The system of claim 1, wherein the output is in XML format.

4. The system of claim 3, wherein the animation engine comprises an XML parser component that receives XML formatted output from the language processor component and determines which images to retrieve and render based at least in part on the XML formatted output.

5. The system of claim 3, further comprising a scene generator that arranges the images in a manner consistent with a meaning of the natural language input.

6. The system of claim 1, further comprising a graphics library that comprises a plurality of images corresponding to a multitude of at least the following: actors, actions, backgrounds, and objects.

7. The system of claim 1, wherein the animation is generated in at least one of 2-D or 3-D space.

8. The system of claim 1, wherein the output further comprises at least one of size, dimension, age, mood, and color.

9. The system of claim 1, wherein the input comprises natural language text in sentence form.

10. The system of claim 9, wherein the animation engine generates one scene at a time after each sentence is entered.

11. The system of claim 1, wherein the language processor component begins analysis of the input upon detection of an end-of-sentence indicator in the input.

12. The system of claim 1, further comprising an image generation component that creates and stores new images that are individually associated with a particular term as determined by a user.

13. The system of claim 1, wherein the language processor component assigns a core term to a plurality of synonyms to mitigate needing a different image for each synonym and communicates the core term to the animation engine instead of the synonym specified in the input.

14. The system of claim 1, wherein the animation engine renders the scene after the natural language input is received by the language processor component.

15. A method that facilitates generating illustrations in an instant manner from natural language input comprising:
  employing a processor to execute the illustrations generating methodology, the illustrations generating methodology comprising:
    analyzing natural language input to determine a logical form of the input and translate the logical form into a formatted output, the output comprising at least one of an actor, action, object, and background, wherein the natural language input comprises a plurality of sentences;
    selecting at least one image;
    applying at least one template to the at least one image;
    generating for each sentence an animation dynamically based on the at least one image and the at least one template, wherein each animation is linked to the sentence for which the animation was generated and conveys the meaning of the sentence; and
    arranging the animations in a same order as the sentences are provided in the natural language input and playing the animations in order to simulate a movie, wherein upon the user changing the order of the sentences changes the order of the animations to match the changed order of the sentences without re-analyzing the natural language input and without generating new animations.

16. The method of claim 15, wherein processing the natural language input begins after detecting an end-of sentence indicator.

17. The method of claim 15, further comprising creating at least one new image and adding it to a graphics library from which the images are selected based on the logical form information.

18. A natural language illustration system comprising:
  means for analyzing natural language input to determine a logical form of the input and translate the logical form into a formatted output, the output comprising at least one of an actor, action, object, and background, wherein the natural language input comprises a plurality of sentences;
  means for selecting at least one image;
  means for applying at least one template to the at least one image;
  means for generating for each sentence an animation dynamically based on the at least one image and the at least one template, wherein each animation is linked to the sentence for which the animation was generated and conveys the meaning of the sentence; and
  means for arranging the animations in a same order as the sentences are provided in the natural language input and playing the animations in order to simulate a movie, wherein upon the user changing the order of the sentences changes the order of the animations to match the changed order of the sentences without re-analyzing the natural language input and without generating new animations.

* * * * *

UNITED STATES PATENT AND TRADEMARK OFFICE
CERTIFICATE OF CORRECTION

PATENT NO. : 7,512,537 B2  Page 1 of 1
APPLICATION NO. : 11/086880
DATED : March 31, 2009
INVENTOR(S) : Michel Pahud et al.

It is certified that error appears in the above-identified patent and that said Letters Patent is hereby corrected as shown below:

In column 15, line 28, in Claim 16, delete "end-of sentence" and insert -- end-of-sentence --, therefor.

Signed and Sealed this
Third Day of May, 2011

David J. Kappos
*Director of the United States Patent and Trademark Office*